(12) United States Patent
Fredette et al.

(10) Patent No.: US 8,566,923 B2
(45) Date of Patent: Oct. 22, 2013

(54) ENHANCED ORGANIZATION AND AUTOMATIC NAVIGATION OF DISPLAY SCREENS FACILITATING AUTOMATION CONTROL

(75) Inventors: Mark R. Fredette, Milwaukee, WI (US); Steven J. Kowal, Milwaukee, WI (US); Matt S. Delisle, Glendale, WI (US); Terrie E. Sauvain, Sagamore Hills, OH (US); Ronald E. Bliss, Twinsburg, OH (US); Matthew Robert Ericsson, Lyndhurst, OH (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 323 days.

(21) Appl. No.: 13/019,063

(22) Filed: Feb. 1, 2011

(65) Prior Publication Data
US 2012/0198547 A1    Aug. 2, 2012

(51) Int. Cl.
*G06F 3/048* (2013.01)
*G06F 21/00* (2013.01)

(52) U.S. Cl.
USPC ............................................ 726/19; 715/853

(58) Field of Classification Search
USPC ........................................... 726/19; 715/853
See application file for complete search history.

(56) References Cited

U.S. PATENT DOCUMENTS

| | | | |
|---|---|---|---|
| 4,951,190 A * | 8/1990 | Lane et al. | 700/83 |
| 6,055,369 A | 4/2000 | Sawahata et al. | |
| 6,407,758 B1 | 6/2002 | Usami et al. | |
| 2004/0133853 A1 * | 7/2004 | Poerner et al. | 715/514 |
| 2008/0189536 A1 | 8/2008 | Mann | |
| 2009/0150169 A1 * | 6/2009 | Kirkwood et al. | 705/1 |
| 2009/0327961 A1 * | 12/2009 | De Vorchik et al. | 715/825 |
| 2010/0017746 A1 * | 1/2010 | Husoy et al. | 715/781 |

FOREIGN PATENT DOCUMENTS

EP    1107124 A2    6/2001

OTHER PUBLICATIONS

European Search Report dated Jun. 28, 2012 for European Patent Application No. 12153520.7-2211, 6 pages.

* cited by examiner

*Primary Examiner* — Kambiz Zand
*Assistant Examiner* — Aubrey Wyszynski
(74) *Attorney, Agent, or Firm* — Turocy & Watson, LLP; Alexander Kuszewski; John M. Miller

(57) ABSTRACT

The disclosed subject matter comprises an enhanced screen organizer component (ESOC) that can efficiently control organization and presentation of desired screens, which relate to an industrial control system, to a user. At design time, a designer employs the ESOC to select and organize one or more screens for a project relating to a control system, create and organize screen folders that can contain desired folders or screens in a hierarchical fashion, select a home screen or favorite screens, respectively, for the operator, role or group, wherein a home screen can be a screen a user views when authenticated into a terminal or the screen the user can be returned to in response to selection of a home control. During run time, the user can access desired screens, and use context menus to select a home screen, favorite screens, or other screens, in accordance with user access rights.

29 Claims, 18 Drawing Sheets

ENHANCED ORGANIZATION AND AUTOMATIC NAVIGATION OF DISPLAY SCREENS FACILITATING AUTOMATION CONTROL

TECHNICAL STATEMENT

The subject disclosure relates to automation control, and more specifically, to enhanced organization and automatic navigation of display screens to facilitate automation control in an industrial control system.

BACKGROUND

Industrial control systems can be employed to regulate operation of equipment in an industrial environment, where operation of the equipment can include process(es) typically directed to accomplishment of a complex task or a streamlined, automated task, such as large scale manufacturing. Regulation of operation of the equipment and related process(es) typically exploits and produces substantive amounts of control data, which include configuration data such as controller code, human-machine interface (HMI) data, process recipe(s) and report definitions, or the like. In addition, operation of industrial control systems also produces both real-time and historical data about the status of regulated equipment and related process(es), the data including alarms, process values, and audit/error logs. To operate industrial control systems, various HMIs in the industrial environment render control data (real-time (or last known) and historical data) through operator interfaces which convey process overviews or equipment detail. Multiple operator interfaces can be created to provide rich information related to the various control processes implemented in the industrial control system so that the operator can switch between them to monitor various aspects of the equipment and related process(es) under control. Various factors contribute to the time and human resources necessary to configure an operator interface(s) employed to render control data in an industrial environment, and arrange an operator interface(s) in relation to other operator interfaces or other items (e.g., folders, controls, etc.); such factors include, for example, complexity of the application associated with the control system, complexity of the equipment and related process(es) that are regulated through one or more controllers, amount of control data collected as part of controlling the equipment and the related process(es), and security protocols and associated data necessary to ensure operational integrity of the equipment.

Further, during run time, when an application, associated with a control system includes a significant number of operator interfaces (e.g., screens) that a user has to interact with to facilitate monitoring and controlling operations of the control system, management of the various operator interfaces can be challenging. Various factors contribute to the difficulties faced by a user (e.g., operator) due to having to manage, interact, or navigate a significant number of operator interfaces during run time, wherein the factors can include, for example, the number of operator interfaces associated with the application, the respective types of interfaces, the complexity of the application, control system and/or associated equipment, the amount of control data collected as part of controlling the equipment and the related process(es), the frequency with which a user has to transition from one operator interface to another, and security protocols and associated data necessary to ensure operational integrity of the equipment. Further, different users, who perform different functions in relation to the application and control system, can desire or require different subsets of operator interfaces during run time. Conventional industrial control systems fail to manage operator interfaces effectively. Moreover, due in part to the various roles of users, and various levels of trust associated with respective users, in relation to the application and control system, security of operator interfaces associated with an application and associated control system is a concern.

The above-described deficiencies of today's systems are merely intended to provide an overview of some of the problems of conventional systems, and are not intended to be exhaustive. Other problems with the state of the art and corresponding benefits of some of the various non-limiting embodiments may become further apparent upon review of the following detailed description.

SUMMARY

The following presents a simplified summary in order to provide a basic understanding of some aspects of the subject disclosure. This summary is not an extensive overview, and it is not intended to identify key/critical elements of the subject disclosure or to delineate any scope. The sole purpose of this summary is to present some concepts in a simplified form as a prelude to the more detailed description that is presented later.

The disclosed subject matter can provide for efficient organization, storage and presentation of screens (also referred to herein as, for example, application or control system screens or operator interfaces), which relate to an industrial control system, in a hierarchical architecture for use by a user (e.g., operator, plant supervisor, etc.) during run time. In accordance with various aspects and embodiments, the disclosed subject matter can comprise an enhanced screen organizer component (ESOC) that can be employed during design time to organize one or more screens of an application into a logical presentation (e.g., into logical containers), as specified by a designer, for example. The ESOC also can be employed during run time by a user (e.g., operator, supervisor, maintenance person, etc.) to desirably access the screens or folders that contain screens to facilitate monitoring or controlling operation of a control system, as more fully disclosed herein.

During design time (which can be prior to run time, concurrent with run time or at other times other than at run time (e.g., between run time periods)), the ESOC can be used to desirably organize one or more screens relating to a project associated with an industrial control system, wherein the screens can be organized and placed into (e.g., stored in) one or more respective folders that can be created using the ESOC, and/or a folder can be created and stored in another folder to create another level in the multi-level hierarchical screen organization system. The ESOC also can be employed to select a particular screen as a home screen, wherein, as desired, a screen(s) can be selected to be a global or default home screen, or a respective home screen relating to a particular user, group of users, or role of a user, for example. During run time, the home screen can be a screen first presented to the user at the terminal when authenticated into a terminal or the screen the user can be returned to in response to selection of a home control.

In another aspect, during design time, the designer also can select one or more of the screens of a project as favorites (e.g., pre-selected or pre-configured favorite screens), wherein the screens that are included in the favorites folder can be accessed (e.g., during run time) by selection of the favorites control (e.g., in a tool bar or menu) to display the favorite screens and selection of the desired favorite screen (e.g., during run time). The information (e.g., code or other data) relating to the organization of the screens and folders for the project can be stored (e.g., in a data store, on a flash drive or storage disk, etc.). When the terminal is booted up and/or accessed by a user (e.g., operator, supervisor, maintenance person, etc.), the stored information can be retrieved and used to present the screens, folders, menus, controls, etc., in accordance with the design structure implemented by the designer.

During run time, a user, such as an operator or supervisor, can boot up or access a terminal (e.g., comprising a human-machine interface (HMI)) associated with a control system, open the project (e.g., open the application) associated with a control system, and/or provide proper authentication credentials to access the terminal and/or project. When authentication is employed, in response to receiving proper authentication credentials, the user can be granted a subset of access rights in relation to the project based at least in part on the authentication credentials presented and/or role of the user. While accessing the terminal, the user can access all or a portion of the desirably organized folders and screens, in accordance with the user's access rights, to facilitate, for example, monitoring operation of the control system, adjusting parameters to the control system, and/or making changes to the control system, etc. For instance, an operator monitoring operation of a particular portion (e.g., sub-system) of a control system can access a screen that represents the layout and/or high-level operating conditions of that control system portion, and if desired, the operator can select a desired folder or screen in a menu (e.g., pop-up or overlay menu that appears in response to a hover or other user action) or tool bar (e.g., located in a portion of the display or pop-up or overlay tool bar that appears in response to a hover or other user action) to access another screen that drills down to a particular piece (e.g., data structures, system parameters, equipment (e.g., conveyer belt) in control system, etc.) of the control system portion, or access another screen of a different portion of the control system.

In still another aspect, as desired, the terminal can display a favorites folder or menu (e.g., in a portion of the display, or in response to user action to cause it to display), and the user can access favorite screens by selecting the favorites control to access a favorites folder or menu, and/or select (e.g., automatically or dynamically) a screen as a favorite screen to be stored in the favorites folder or menu, or as a home screen, in response to user actions or commands (e.g., selecting or clicking on a screen, wherein, for example, a context menu, such as a long-press context menu, can be presented to enable the user to select or store the screen as a favorite screen or home screen). In another aspect, a favorite screen(s) also can be automatically or dynamically identified and stored in the favorites folder or menu based at least in part on predefined screen selection criteria (e.g., frequency or trending of usage of a screen over a given time period, most recently used screens, in accordance with user-specified favorite-screen selection preferences, etc.). As desired, there can be respective favorites folders or menus associated with respective users, roles, etc., and/or a global favorites folder or menu usable by all or some users.

In accordance with various aspects, the disclosed subject matter can comprise a system that includes at least one processor configured to execute one or more sets of code instructions retained in at least one memory, the one or more sets of code instructions, when executed by the at least one processor, implement a group of components. The system also can include an ESOC that is configured to organize one or more screens, and one or more folders, in relation to each other in a multi-tier structure, in accordance with at least one predefined organization criterion, to generate an organized screen-folder structure, which is associated with an application that facilitates operation of a control system. The system can further include an interface component that is configured to present at least a portion of the organized screen-folder structure, comprising at least a portion of the one or more screens and the one or more folders, in accordance with the organized screen-folder structure, to facilitate the operation of the control system.

In accordance with various other aspects, the disclosed subject matter can include a method comprising employing at least one processor to execute code instructions retained in a memory, the code instructions when executed by the at least one processor perform at least the following group of acts. The method further comprising the act of organizing one or more screens and one or more folders in relation to each other to form a multi-level organized application structure at least during design time, based at least in part on predefined organization criteria and an application associated with an industrial control system, wherein the multi-level organized application structure facilitates controlling at least a portion of the industrial control system during run time. The method also comprising the act of presenting at least a portion of the one or more screens and the one or more folders that are part of the multi-level organized application structure.

In accordance with still other aspects, the disclosed subject matter can comprise a computer program product comprising a computer-readable storage medium that retains computer-readable instructions that, when executed by at least one processor, cause at least one processor to organize one or more screens and one or more folders in relation to each other to form a multi-tier organized application structure at least during design time, based at least in part on predefined organization criteria and an application associated with an industrial control system, wherein the multi-tier organized application structure facilitates control of at least a portion of the industrial control system during run time; and display at least a portion of the one or more screens and the one or more folders in accordance with the multi-level organized application structure.

To the accomplishment of the foregoing and related ends, certain illustrative aspects of the disclosed subject matter are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
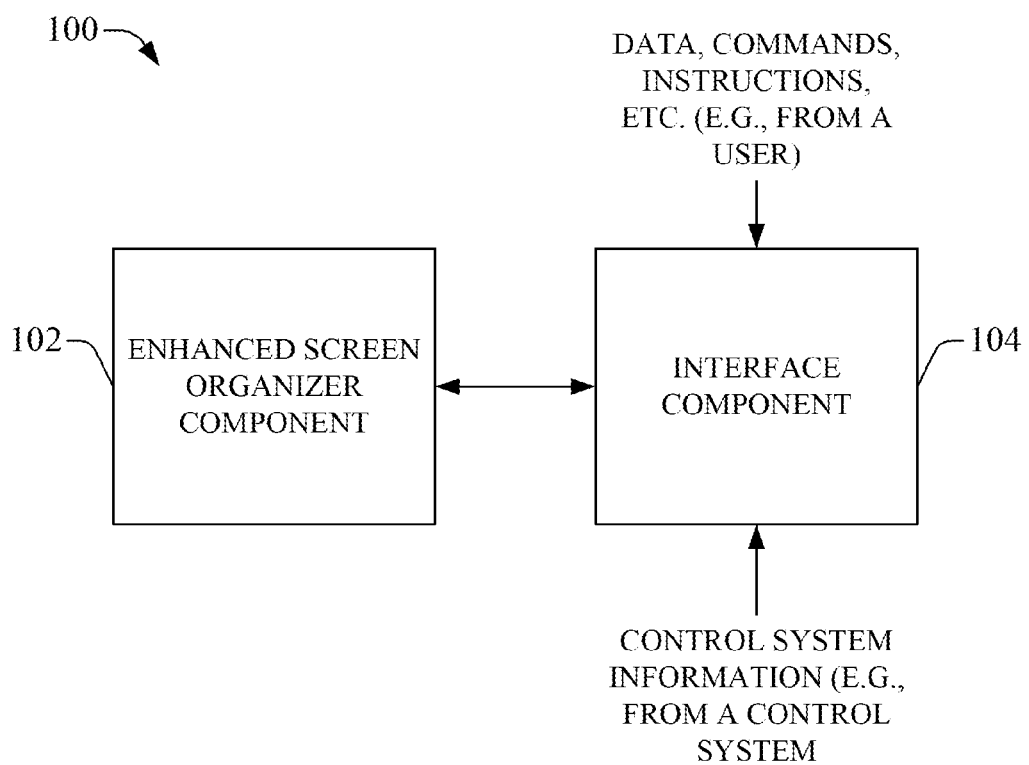
FIG. 1 illustrates a block diagram of an example system that can efficiently organize and control access to screens (e.g., application or control system screens) associated with a control system in accordance with various aspects and embodiments.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface", "client", and the like, can refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removably affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the terms "set" or "subset" as employed herein exclude the empty set; e.g., the set with no elements therein. Thus, a "set" or a "subset" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

The disclosed subject matter comprises an enhanced screen organizer component (ESOC) that can efficiently control organization and presentation of desired screens (e.g., operator interfaces), which relate to an industrial control system, to a user. At design time, a designer employs the ESOC to select and organize one or more screens for a project relating to a control system, create and organize screen folders that can contain desired folders or screens in a hierarchical fashion, select a home screen or favorite screens, respectively, for the operator, role or group, wherein a home screen can be a screen a user views when authenticated into a terminal or the screen the user can be returned to in response to selection of a home control. During run time, the user can access desired screens, and use context menus to select a home screen, favorite screens, or other screens, in accordance with user access rights.

FIG. 1 illustrates a block diagram of an example system 100 that can efficiently organize and control access to screens (also referred to herein as, for example, application or control system screens or operator interfaces) associated with a control system in accordance with various aspects and embodiments. The system 100 can enable efficient organization and storage of screens, which can relate to an industrial control system, in a hierarchical architecture during design time, for use by a user (e.g., operator, plant supervisor, etc.) during run time.

In accordance with various aspects and embodiments, the system 100 can comprise an ESOC 102 that can be employed during design time and/or run time to desirably create and/or organize one or more screens relating to a project associated with an industrial control system. In an aspect, the ESOC 102 can be associated with (e.g., communicatively coupled to) an interface component 104 that can be employed to receive user input (e.g., data, user selections, etc.), receive input from the control system (e.g., control system information associated with operation of the control system), and/or present (e.g., display, present via audio, etc.) information (e.g., screens, folders, control system information, etc.) to a user using a terminal (not shown in FIG. 1) associated with (e.g., that includes) the interface component 104.

As desired, in accordance with the control system, application, and desired design (e.g., arrangement of screens and folders in a multi-tier design structure), the user can utilize the ESOC 102 (via the interface component 104) to generate, organize, or place (e.g., store) one or more screens in to one or more respective folders that can be created (e.g., generated) using the ESOC 102, create and store a folder in another folder to create another level in the multi-tier design structure (also referred to herein, for example, as a multi-level hierarchical screen organization structure, a multi-tier screen-folder structure, a multi-tier organized application structure, or multi-level organized application structure), and/or create or locate a screen on its own outside of a folder. Also, as desired, a particular screen can be associated with (e.g., stored in) more than one folder. For instance, a first folder (e.g., container) can be employed to contain screens, including a particular screen, relating to a particular portion of a sub-system of a control system; and a second folder can be employed to contain screens, including that particular screen, that provide certain parameter values for the sub-system. In such instance, the user (e.g., operator, supervisor) can access that particular screen by accessing or selecting either the first folder or second folder. In an aspect, in addition to the direct use of a particular screen, there can exist multiple references to the same screen where each reference can contain a different set of parameter data. For example, one reference of that screen can be accessed or used by one user (e.g., operator), while another reference of that screen can be accessed or used by another user (e.g., supervisor or another operator); or one reference of that screen can be accessed or used on the terminal, while another reference of that screen can be accessed or used on a remote terminal. Essentially, with the multiple references to the same screen, the content of the screen can be shared multiple times within the application and can provide inheritance so that a change to the screen can be reflected in all instances of the screen within the multi-level hierarchical screen organization structure (e.g., a menu in such structure).

In one aspect, using (e.g., manipulating, selecting) one or more controls provided by the ESOC 102 via the interface component 104, the user (e.g., designer, who also can be an operator or supervisor) can create (or remove) a screen or folder, name (or re-name) a screen or folder, add (or remove) a screen or folder to (from) another folder, control access to a folder or screen (e.g., allow or restrict access to a folder or screen, for example, based at least in part on the user, type of group of users, or type of role, etc.), or filter the viewing of folders and/or screens by users. During the design time, which can be prior to run time, concurrent with run time or at another time other than during run time, using (e.g., manipulating, selecting) the one or more controls provided by the ESOC 102 via the interface component 104, the user can view, configure and organize the folders and screens in an application, can configure or define the display of the folders and screens during run time, including navigation of the folders and screens, can filter the display of folders and screens to respective users, groups of users or roles during run time (e.g., to facilitate controlling access to the folders and screens in accordance with one or more user characteristics, such as name of user, role of user, user group to which the user belongs, etc.), etc.

In an aspect, using the ESOC 102 and interface component 104, the multi-tier design structure, as initially designed during a design time period prior to run time, can be modified during run time (e.g., while on-line) or at other desired times (e.g., time periods between run time periods). For instance, the ESOC 102, via the interface component 104, can provide a subset of configuration screens and/or menus comprising a subset of configuration options and associated controls usable to select or implement desired configuration options to enable a user to modify the multi-tier design structure during run time or at other desired times. During run time, the subset of configuration screens and/or menus and the subset of configuration options (and associated controls) can be the same or different than the configuration screens, menus, options, or controls available to a user during a design time period that is not during run time. For example, if desired, the configuration screens, menus, options, or controls can be more limited during run time than during a design time period that is not during run time. In another aspect, the subset of configuration screens and/or menus and the subset of configuration options (and associated controls) presented or available for access by a user can be controlled based at least in part on the access rights granted to the user and/or the role of the user. Thus, one user (e.g., a designer) can or may have access to more configuration screens, menus, options, or controls than another user (e.g., operator) in accordance with respective access rights of the users and/or respective roles of the users.

In another aspect, using a desired control (e.g., display name control), the user (e.g., designer) can assign a "display name" to each screen (e.g., display name can be "Room B" for a screen that contains information relating to Room B of the control system). The display name for a screen can be the same as or different from the name assigned to the screen for the project or application. For instance, the display name for a screen can be "Room B" as the icon of the screen is displayed on the display of the interface component 104, while the name of the screen can be, for example, "ProjectX_RoomB_StatusParameters" as it is defined for the project or application, so the screen name will be the name that is called by the ESOC 102 to access that screen. In still another aspect, the display name can be localized to support multiple languages (e.g., English, Spanish, French, Italian, German, Japanese, Chinese, etc.), such that the user (e.g., operator) can select a desired language so that display names (e.g., as shown in a menu or as otherwise displayed on the display) can be modified (e.g., translated) to and/or displayed in the desired language to the user via the interface component 104, or alternatively or additionally, the desired language can be automatically selected based at least in part on the authentication credentials of the user, wherein the user's authentication credentials can be mapped to a particular language desired by the user to be used to display information to the user.

In yet another aspect, an item (e.g., screen, folder, etc.) can be represented by a generic icon, or can be represented by a graphical icon, image, or picture (e.g., thumbnail image or picture) that can aid in allowing the user to more easily recognize what the item is to facilitate navigation by the user to the desired item and associated location. For example, the graphical icon or picture for a particular screen can be a thumbnail picture of the particular screen, wherein a picture or depiction of the particular screen as it is normally displayed can be scaled down to the size desired for the graphical icon or picture.

In still another aspect, respective screens can be parameterized such that the same screen with different subsets of data can be used to respectively display different portions of a component(s) (e.g., machine, conveyer, etc.) of the control system associated with the screen. There can be multiple instances or references of this same screen, wherein the respective multiple instances or references of the same screen can have respective (e.g., different) subsets of data. In an aspect, the ESOC 102 can provide, via the interface component 104, a menu system comprising one or more shortcut controls, that can allow the user, by manipulating or selecting the shortcut control, to quickly navigate from a first instance of a screen having a first data subset to one or more other instances of the screen having respective data subsets. This menu system can be initiated or accessed using, for example, a physical button or soft button associated with a keyboard or touch screen GUI display. This menu system can be on an HMI, and can be visible to a user when looking at the display screen, but also can be available (e.g., visible) if the HMI application is being viewed remotely via, for example, a thin or thick client that can be connected to the HMI application via a wireline or wireless communication network, such as more fully disclosed herein.

During run time, at least during an initial (e.g., first) runtime session, the hierarchy of folders and screens for an application or project can be available for display, via the interface component 104, as configured or defined by the designer when the application or project was created by the designer, although the operator or other user can employ the ESOC 102 to modify the organization of folders and screens (e.g., modify favorites, modify home screen) as permitted in accordance with the access rights granted to the operator or other user, and/or the ESOC 102 can modify the organization of folders and screens (e.g., modify favorites, modify home screen), in accordance with predefined organization criteria.

The predefined organization criteria can relate to, for example, the functions or components of the control system, the application associated with the control system, the screens available in the application, type(s) of screen, information relating to the control system that is contained in a screen, relation of a screen or folder to another screen or folder, control system parameters associated with a particular screen, suitability of a screen to be a home screen, suitability of a screen to be a favorite screen, frequency (e.g., expected frequency of observed frequency) or recency of accessing a particular screen, length of time of accessing of a screen relative to other screens, likelihood that a user who will utilize a first screen will also utilize another particular screen or folder, likelihood that a user who will utilize a first screen will next utilize another particular screen or folder, type of user, type of user group, role of a user, access rights of a user, work functions to be performed by a user in relation to the application and control system, etc.

In another aspect, a screen can comprise information relating to the control system, wherein the information can comprise, for example, objects representing items (e.g., pieces of equipment in the control system, pieces generated using the control system, etc.), data objects or structures associated with the control system, parameter values (e.g., static parameters, dynamically changing parameters) associated with the control system, etc. A screen can relate to or represent an overview (e.g., graphical illustration) of an entire control system or portion thereof, a particular process (e.g., mixing process, measuring process, etc.) or piece (e.g., piece of equipment, such as a conveyer belt) of the control system, parameter values relating to operations of the portion of the control system included in the screen, etc. The information contained in or presented by a particular screen can be changing (e.g., dynamically) over time for the associated control system, so data presented on a screen at one particular time can be different (or same) as data presented on the screen at another moment in time.

In an aspect, using a specified control or menu (e.g., long press context menu) by the ESOC 102 (e.g., via the interface component 104), the ESOC 102 also can be employed (e.g., by a designer or other user) to select a particular screen associated with a control system as a home screen (e.g., pre-configured home screen, subsequently selected home screen), wherein, as desired, a screen(s) can be selected to be a global or default home screen (e.g., a home screen assigned (e.g., automatically or by default) to a user(s) when no other screen has been selected as a home screen for that user(s)), or a respective home screen relating to a particular user, group of users, or role (e.g., operator, supervisor, maintenance person, etc.) of a user for that application, for example. For instance, it can be desirable for an operator who monitors and operates a particular portion of a control system to have one particular screen (e.g., screen representing that particular portion of the control system) as a home screen, and for the supervisor who monitors a larger portion of the control system to have a different screen (e.g., screen representing the entire or a larger portion of the control system) as a home screen. As such, the designer, or other user (e.g., operator, supervisor), can select a particular screen as a home screen (e.g., when in accordance with granted access rights). During run time, the home screen of the user of the terminal typically can be a screen first presented to the user in a display screen of the interface component 104 at the terminal (e.g., via a human-machine interface (HMI)) when authenticated to be granted access the terminal, or can be the screen the user can be returned to (e.g., as displayed in a display screen of the interface component 104) in response to selection of a home control on the interface component 104 by the user.

In still another aspect, during design time, using a specified control or menu provided by the ESOC 102 via interface component 104, the designer also can select one or more of the screens of a project as favorites (e.g., pre-selected or pre-configured favorite screens), wherein (e.g., during run time) the screens that are included in the favorites folder (or menu) can be accessed by selection of the favorites control (e.g., in a tool bar or menu), which can be provided via the interface component 104, to display the favorite screens associated with the user, and the desired favorite screen (e.g., during run time) can be selected by the user using the interface component 104 (e.g., touch screen interface, keyboard, mouse, etc.). The information (e.g., code or other data) relating to the organization of the screens and folders for the project can be stored in a desired storage location (e.g., in a data store, on a flash drive or storage disk, etc.). The information can be stored on or can be accessible by the terminal during run time, so that the application can be operated in accordance with the design structure for the organization of folders and screens in the application, as specified by the designer. When the terminal is booted up and/or accessed by a user (e.g., operator, supervisor, maintenance person, etc.), the stored information can be retrieved by the ESOC 102 and used by the ESOC 102 to present the screens, folders, menus, controls, etc., in accordance with the multi-tier design structure implemented by the designer.

In an aspect, the ESOC 102 of the terminal also can contain pre-build content that can be stored in a data store associated with the ESOC 102 at all times or as otherwise desired. The pre-build content can comprise, for example, a terminal configuration screen, one or more trend screens, an alarm management screen, or other desired content, wherein the pre-build content can facilitate at least some level of operation of the terminal and/or at least some level of operation of, management of, or feedback from the control system associated with the terminal. Even if an application is not yet loaded on the terminal, or if an application is not opened or accessed, the ESOC 102 can present, via the interface component 104, a menu system that can provide navigation to the pre-built content. In the design environment, the ESOC 102 can provide one or more functions, via the interface component 104, that can enable a user to choose a location(s) within a menu where the user desires the navigation of the pre-build screens to appear. As a result, the ESOC 102 can be available on the terminal at all times (or desired times) and there can be at least some default content that can be made available to the user.

During run time, a user, such as an operator or supervisor, can boot up or access the terminal (e.g., comprising or associated with ESOC 102 and interface component 104) associated with the control system, open the project (e.g., open the application) associated with a control system, and/or provide proper authentication credentials to access the terminal and/or project. When authentication is employed, in response to receiving proper authentication credentials, the user can be granted a subset of access rights in relation to the application or project associated with the control system, based at least in part on the authentication credentials presented, name of the user, role of the user, and/or user group with which the user is associated. While accessing the terminal, using the ESOC 102 and interface component 104 (e.g., using one or more controls and one or more menus provided by the ESOC 102 via the interface component 104), the user can access all or a portion of the desirably organized folders and screens, in accordance with the user's access rights and multi-tier design structure of the screens and folders, to facilitate, for example, monitoring operation of the control system, adjusting parameters to the control system, and/or making changes to the control system, etc. For instance, via the interface component 104, an operator monitoring operation of a particular portion (e.g., sub-system) of a control system can access and display a screen that represents the layout and/or high-level operating conditions of that control system portion, and if desired, the operator can select a desired folder or screen in a menu (e.g., pop-up or overlay menu that appears in response to a hover or other user action) or tool bar (e.g., located in a portion of the display or pop-up or overlay tool bar that appears in response to a hover or other user action) to access another screen that drills down to a particular piece (e.g., data structures, system parameters, equipment (e.g., conveyer belt) in the control system, etc.) of the control system portion, or access another screen of a different portion of the control system.

It is to be appreciated and understood that, in accordance with various aspects and embodiments, with regard to items (e.g., screens, folders, controls, etc.), the term "access" can mean that the user can see all of the items on the display of the interface component 104 and only can open and/or go into those items for which the user is granted access rights; or can mean that the user can see all of the items on the display but the items for which the user is not granted access rights can be grayed out as displayed, while the items for which the user is granted access rights can be displayed more prominently than the grayed-out items; or can mean that only the items for which the user is granted access rights can be displayed on the display of the interface component 104, but other items for which the user does not have access rights are not displayed on the display of the interface component 104.

In still another aspect, as desired, the interface component 104 associated with the terminal can display a favorites folder or menu (e.g., in a portion of the display, or in response to user action to cause the favorites folder or menu to display), and the user can access a favorite screen by selecting the favorites control displayed in a menu of controls to access the favorites folder or menu, and/or can select (e.g., automatically or dynamically) a screen as a favorite screen to be stored in the favorites folder or menu, or as a home screen, in response to user actions or commands (e.g., selecting or clicking on a screen) received via the interface component 104 and implemented by the ESOC 102. For example, the ESOC 102 can provide a context menu, such as a long-press context menu, that can be presented to the user via the interface component 104 to enable the user to select or store the screen as a favorite screen or a home screen, wherein, in response to specified user activity (e.g., continuous user input) in relation to a screen (e.g., mouse clicking or touching the screen continuously for a predefined amount of time), the long-press context menu of the ESOC 102 can identify that the current screen has been selected to be a favorite screen or a home screen, depending in part on the function (e.g., favorite screen selection function, home screen selection function) being implemented by the long-press context menu. In another aspect, the ESOC 102 also can automatically or dynamically identify and store a favorite screen(s) in the favorites folder or menu based at least in part on the predefined organization criteria (which can comprise, for example, predefined screen selection criteria) (e.g., frequency or trending of usage of a screen over a given time period, most recently used screens, in accordance with user-specified favorite-screen selection preferences, etc.). As desired, there can be respective favorites folders or menus associated with respective users, roles, etc., and/or a global favorites folder or menu usable by all or some users, in accordance with respective access rights of the users.

In another aspect, during design time or at another desired time, a user (e.g., designer, supervisor) can utilize the ESOC 102, via the interface component 104, to control access to respective screens or folders associated with an application, wherein access rights to a particular subset of screens and/or folders can be associated with (e.g., tied or mapped to) authentication credentials (e.g., username, password, personal identification number (PIN), and/or biometric authentication credentials (e.g., fingerprint, facial recognition, eye scan, etc.), etc.) that can be assigned or provided to a user. When a user attempts to access the terminal or application, the ESOC 102, via the interface component 104, can prompt the user to enter authentication credentials in order to access the terminal or application. The user can enter authentication credentials via the interface component 104. The ESOC 102 can analyze the authentication credentials received from the user and can compare the received authentication credentials to stored authentication credentials to determine whether the received authentication credentials match any of the stored authentication credentials.

If the authentication credentials entered into the interface component 104 do not match any of the stored authentication credentials, the ESOC 102 can determine that access is to be denied to the user, and/or can prompt the user to attempt to enter authentication credentials again, for example, up to a predefined maximum number of authentication attempts, wherein, if authentication fails up to the point where the predefined maximum number of authentication attempts is met, the user can be locked out of the terminal or application for at least a predefined amount of time and/or a notification of the authentication failure can be provided to a desired entity (e.g., a supervisor or plant manager). If the ESOC 102 determines the received authentication credentials (e.g., during any valid authentication attempt) match stored authentication credentials, the ESOC 102 can analyze the authentication credentials to identify the access rights that are to be granted to the user based at least in part on the validated authentication credentials. For instance, the authentication credentials can be associated with (e.g., mapped to) a subset of access rights to the terminal or application, wherein the access rights can relate to or be associated with (e.g., mapped to) the screens or folders that can be accessed by the user, organization of the screens or folders in the hierarchical organization structure, favorite screens associated with the user, home screen associated with the user, user preferences, desired types and/or arrangements of menus and/or tool bars, history of the user (e.g., history of actions of the user in relation to the application or terminal), etc.

In accordance with the identified access rights for the user, the ESOC 102 can control access to the set of screens and folders associated with the application by the user. For instance, the ESOC 102 can filter the set of screens and folders associated with the application to generate a subset of screens and folders, wherein the ESOC 102 can control access of the user by only allowing the user to access the subset of screens and folders, and can restrict access to the other screens and folders in the set by the user. As a result, when using the terminal and associated interface component 104, the user can only access those screens and folders of the subset of screens and folders for which the user has access rights, wherein the subset of screens and folders can be arranged in relation to each other in accordance with the multi-tier design structure specified by the designer during design time (including any modification to the arrangement that is in accord with the multi-tier design structure).

In an aspect, authentication credentials associated with one subset of access rights can be the same or different than authentication credentials associated with that same subset of access rights. That is, a subset of access rights can be associated with one or more respective sets of authentication credentials, for example, when the respective authentication credentials are associated with users having the same or similar role, or users that are part of the same group of users. Additionally or alternatively, users that are to have the same access rights can be provided the same authentication credentials.

In another aspect, the authentication credentials can be provided to the interface component 104 by a user using a touch screen interface, keyboard or keypad, mouse, biometric interface, magnetic stripe reader, radio frequency identification (RFID) reader, bar code reader (e.g., scanner), smart card reader, or other desired interface of the interface component 104. In an embodiment, the user can have an identification (ID) card (e.g., employee ID card, RFID tag, and/or smart card, etc.) that can comprise the user's authentication credentials, or a portion thereof (e.g., stored on the card).

Figure 2:
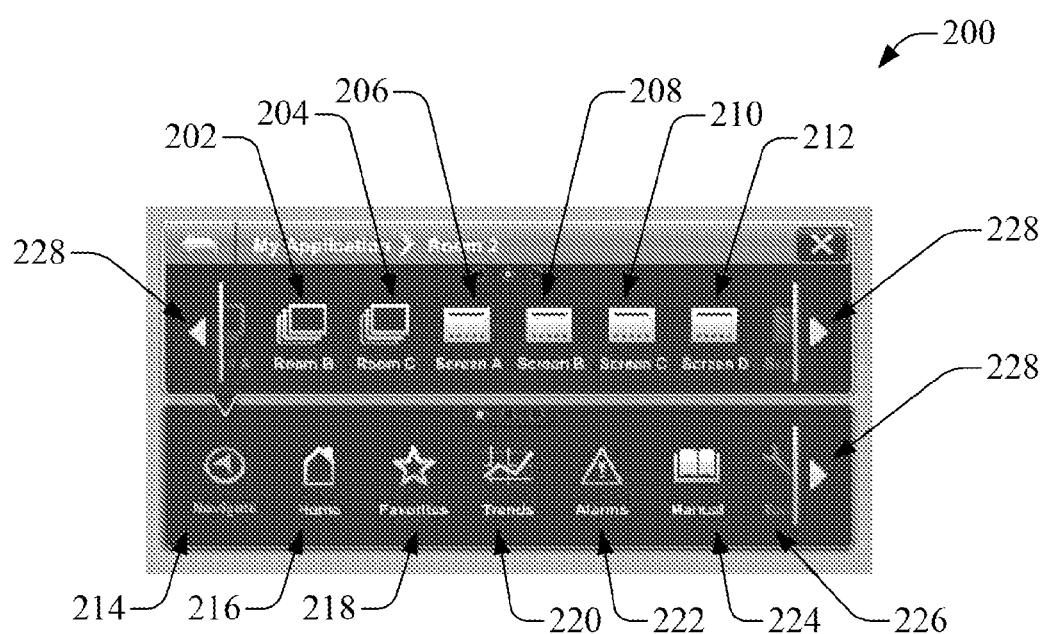
FIG. 2 depicts an example menu (or tool bar) that can be employed to facilitate navigating and accessing screens and folders associated with an application in accordance with aspects of the disclosed subject matter.

To further illustrate certain aspects of the disclosed subject matter, FIG. 2 illustrates an example menu (or tool bar) 200 that can be employed to facilitate navigating and accessing screens and folders associated with an application in accordance with aspects of the disclosed subject matter, and FIGS. 3-6 illustrate example screens associated with a control system in accordance with aspects of the disclosed subject matter. With regard to FIG. 2, the menu 200 is a menu (or tool bar) that can be presented on a display screen of the interface component 104 to present desired controls, screens, folders, etc., to the user in relation to the application associated with a control system to facilitate accessing desired folders or screens or performing other desired functions, for example, during run time.

It is to be appreciated and understood that, the icons associated with (e.g., representative of) the items (e.g., controls, screens, folders, etc.) and the display name text for the respective items can be configured on a per screen basis and/or per user basis. For example, a particular item (e.g., screen) can have a first display name text (e.g., Room B) when displayed on a first screen, and that same particular item can have a second display name text (e.g., Material Processing Room) when displayed on a second screen. As another example, a particular item (e.g., screen) can be displayed having a first display name text (e.g., Room B) when accessed by a first user in accordance with a first set of authentication credentials, and that same particular item can be displayed having a second display name text (e.g., Material Processing Room) when accessed by a second user in accordance with a second set of authentication credentials (e.g., based at least in part on user preferences of the respective users). Further, the language employed for display name text can be selected from a set of specified languages (e.g., English, Spanish, French, Italian, German, Japanese, Chinese, etc.), wherein, based at least in part on a user (e.g., as identified by the user's authentication credentials) or selection of a desired language by a user, the ESOC 102, via the interface component 104, can present and/or translate the display name text in/to a desired language, so that the user is able to understand to what aspect of the system the item relates. In another aspect, an item (e.g., screen) can be displayed as a thumbnail picture of the item, which can facilitate easy identification of the aspect of the system represented by the item.

In accordance with an example embodiment, the menu 200 can include a Room B control 202 that can be a control for a Room B folder that can contain screens and/or folders, wherein the Room B control 202 can be selected (e.g., by mouse click, screen touch, etc.) to access a desired screen or folder in the Room B folder. The menu 1200 also can include, for example, a Room C control 204 that can be a control for a Room C folder that can contain screens and/or folders wherein the Room C control 204 can be selected to access a desired screen or folder in the Room C folder.

As desired, the menu 200 also can include Screen A control 206, Screen B control 208, Screen C control 210, and Screen D control 212, wherein the respective screen controls can be selected to access Screen A, Screen B, Screen C, and Screen D, respectively. As more fully disclosed herein, a name, such as "Screen A", can be the display name for a particular item, wherein the display name can be the same as or different from the name of the particular item in the application or project. In another aspect, the menu 200 can comprise a navigation control 214 that can be employed to enable a user to navigate or transition from a currently displayed screen of a current tier to another tier, another screen, or a folder, in response to selection of the navigation control 214 on the interface component 104. For example, if a screen in a lower tier is currently displayed on the interface component 104, and the navigation control 214 is manipulated or selected, the ESOC 102 can navigate away from the currently displayed screen to display items (e.g., folder(s), screen(s), control(s)) in the next highest tier above the tier associated with the screen being left. The user can then navigate to another desired item by selecting one of the controls associated with the desired item or perform another desired action depending in part on the items available in that next highest tier.

In another aspect, additionally or alternatively, the navigation control 214, or another specified control, such as a search control (not shown), can be employed to facilitate searching for a desired screen, folder, or other item. For instance, in response to selection or manipulation of the navigation control 214 or other specified control, a search field can be presented on the display of the interface component 104, and the user can enter information (e.g., search word or phrase, screen name, folder name, item name, type of screen, etc.) into the search field via the interface component 104. In an aspect, the control can include an automatic-fill, automatic-complete, or automatic-presentation function, wherein the search field can automatically fill, complete, or present one or more search results (e.g., screen, folder, link to screen, link to folder, etc.) in response to partial (or complete) search information entered into the search field and/or other search parameters (e.g., type of item, date of item, etc., entered or selected in other search fields). Selection of a search result via the interface component 104 can result in the display of the item (e.g., screen, folder) associated with the search result on the display screen of the interface component 104. As desired, this search function of the navigation control 214 or other control can be made available to the designer, who typically can have a significant number of items to work with when designing an application structure, and/or other users, such as operators or supervisors, for example. In another aspect, as desired, the search for items can be limited and/or the search results can be filtered, based at least in part on the access rights of the user, such that only those items for which the user is granted access are searched and/or the search results can be filtered to include only those items for which the user is granted access and which are responsive to the search.

In still another aspect, the menu 200 can comprise a home control 216 that can be utilized to enable the user to transition from a currently displayed screen to the home screen in response to a single manipulation of the home control 216 on the interface component 104. In yet another aspect, the menu 200 can include a favorites control 218 that can be used to access a menu or list of favorite screens, which can be presented to the user via the interface component 104, wherein selection of a favorite screen in the favorite screen menu or list can be received from the user via the interface component 104, and the ESOC 102 can access the selected favorite screen, which can be displayed on the display of the interface component 104.

In accordance with an embodiment, as desired, while not shown in the menu 200 as illustrated in FIG. 2, the menu 200 can have a portion dedicated to displaying an item (e.g., an icon representing the item) identified as a potential next item that the user may desire to access next. For instance, while a screen is displayed by the interface component 104, the ESOC 102 (and/or an intelligent component (not shown)) can analyze current and historical information relating to the user or application and, based at least in part on the analysis, can determine or infer a next item(s) (e.g., next screen) that is most likely desired to be accessed and viewed next, and can select the next item(s) for display in the dedicated portion of the menu 200. The ESOC 102 (and/or intelligent component) can analyze current and historical information relating to, for example, the currently displayed item, the user (e.g., role of the user, who the user is), time of day, current status of the application or control system, historical status of the application or control system, items for which access is permitted to the user in accordance with the access rights granted to the user, and/or other information to facilitate determining or inferring a next item(s) to display in the dedicated portion of the menu 200. For example, a user can be viewing a particular screen on the display to check the status of certain parameters relating to operation of the control system. The ESOC 102 can analyze current information, such as identifying the particular screen currently being accessed and/or status information (e.g., parameter values, status flags, etc.) contained in the particular screen, and can analyze historical information relating to the particular screen and/or the information to infer or determine what screen is the next screen the user is most likely to access next (e.g., historically, when viewing the particular screen and when the status information is the same or similar to the current status information, the user more frequently accesses this identified "next screen" next than the frequency with which the user accesses other screens).

In an aspect, the menu 200 can contain a trend control 220 that, when selected, can transport from the currently displayed screen to display a screen that can include trend data (e.g., trend data of control-system parameter values of interest to the user) associated with operation of the control system. In still another aspect, the menu 200 can comprise an alarm control 222 that, when selected, can display an alarm screen that provides details regarding current or past alarms and/or can display a screen associated with an alarm, wherein an alarm can indicate, for example, a fault in the control system, a control-system parameter value is outside of predefined threshold value or set of values associated with desired operations relating to that parameter, a security breach in the control system, an undesired slowdown or stoppage in the control system, etc.

In yet another aspect, the menu 200 can include a manual control 224 that, when selected, can display one or more manuals, such as, for example, an operator manual relating to the control system or application. The menu 200 also can contain a tools control 226 that, when selected, can present one or more utilities (e.g., utilities relating to sound, time-date, screen brightness, etc.) and associated controls that can be employed to facilitate modifying configuration or parameter settings for the terminal to modify operation of the terminal. Typically, the tools control 226 is utilized by a designer during design time, although another user, such as an operator, also can utilize the tools control 226. In still another aspect, the menu 200 also can include other controls, such as, for example, one or more scroll controls 228 that can be employed to scroll through available items on the menu 200, for example, when there are more items on the menu 200 than can be displayed given the current size of the menu 200 in the display on the interface component 104. It is to be appreciated and understood that the menu 200 is but one example of the menus that can be employed by the ESOC 102 and presented by the interface component 104, and in accordance with various embodiments, a menu can include more or less, same or different, items or controls than those described with regard to menu 200. Also, as more fully disclosed herein, other types of menus, such as a context menu or long-press context menu can be employed by the ESOC 102 to facilitate accessing screens and folders, selecting screens and folders, navigating between different items, etc., by a user via the interface component 104.

Figure 3:
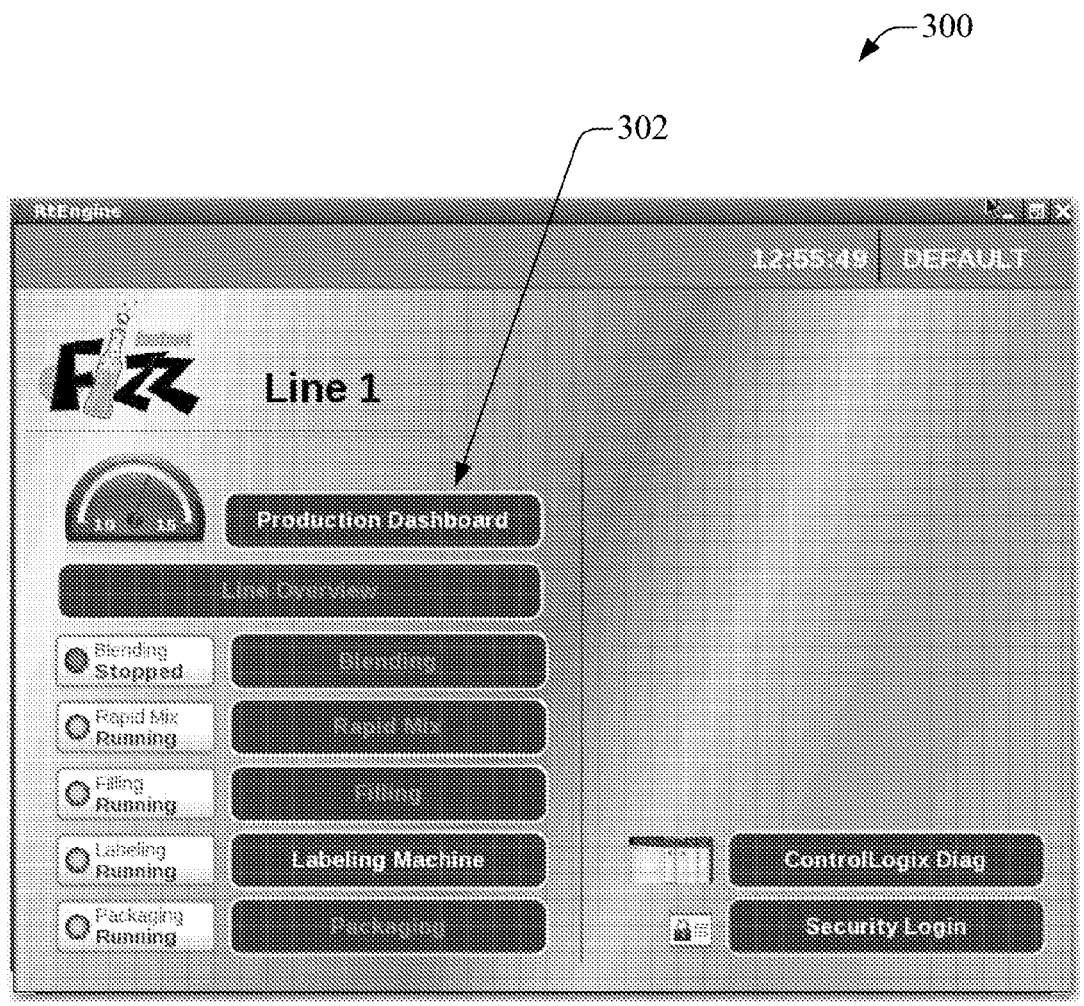
FIG. 3 depicts a diagram of an example screen that can be an example home screen associated with an application in accordance with an embodiment.
Figure 4:
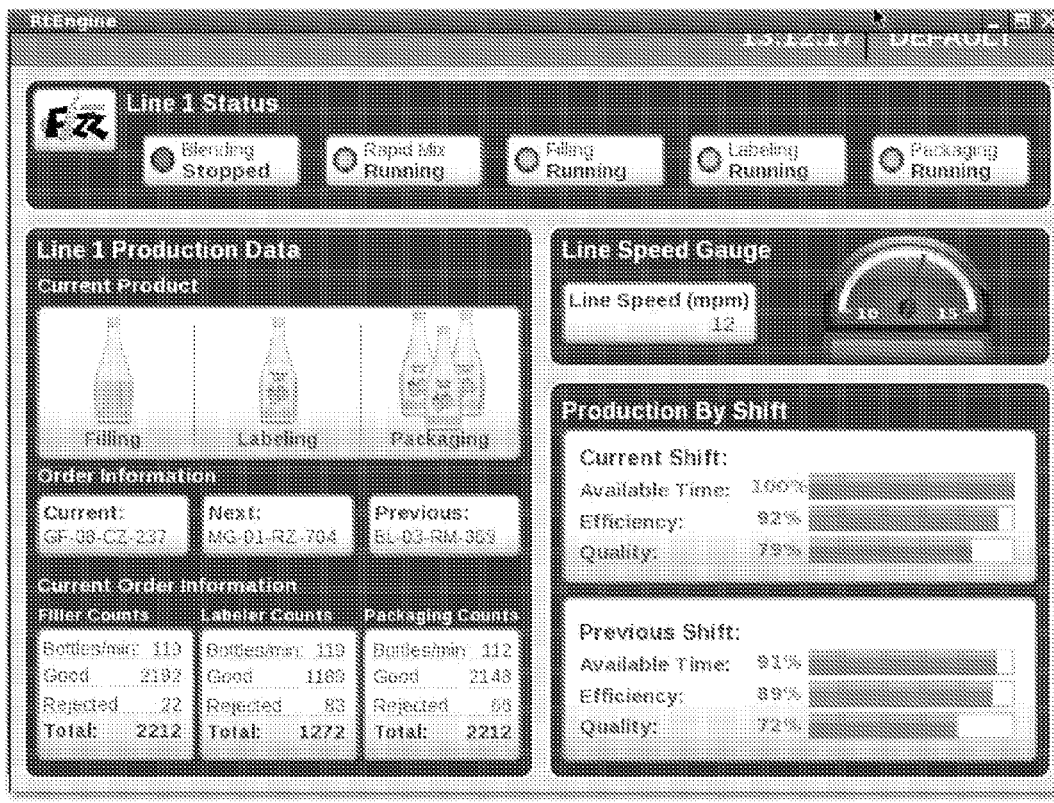
FIG. 4 illustrates a diagram of an example screen that can be an example dashboard screen associated with the application in accordance with an embodiment.
Figure 5:
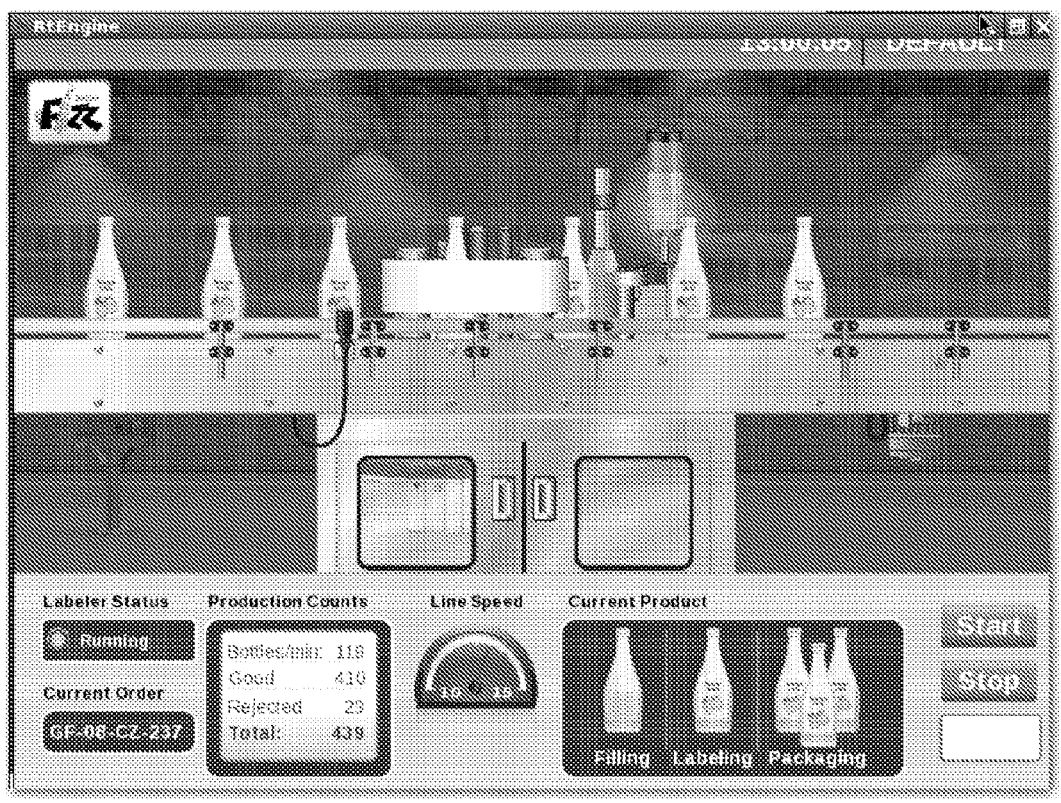
FIG. 5 depicts a diagram of an example screen relating to an example portion of a control system in accordance with an embodiment.
Figure 6:
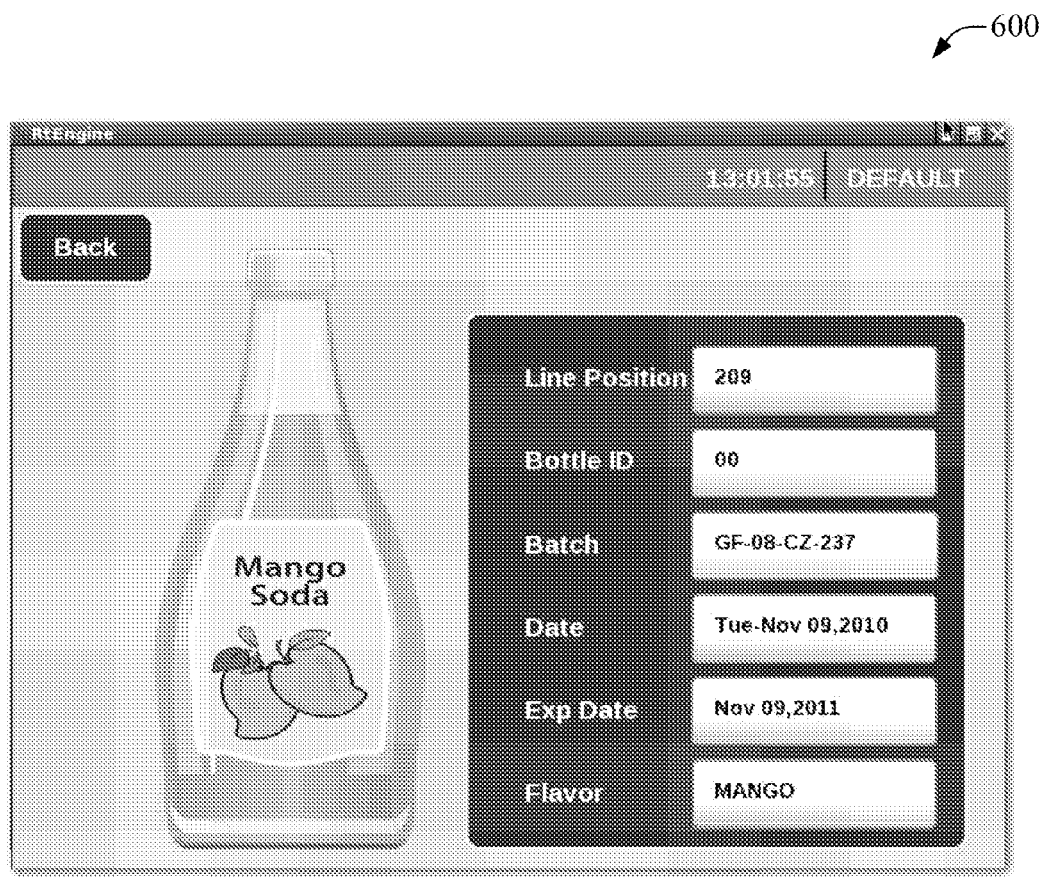
FIG. 6 illustrates a diagram of an example screen relating to a particular piece of product associated with the example portion of the control system in accordance with an embodiment of the disclosed subject matter.

FIG. 3 depicts a diagram of an example screen 300 that can be an example home screen associated with an application in accordance with an embodiment. FIG. 4 illustrates a diagram of an example screen 400 that can be an example dashboard screen associated with the application in accordance with an embodiment. FIG. 5 depicts a diagram of an example screen 500 relating to (e.g., representing) an example portion of a control system (e.g., a conveyer belt and associated product) in accordance with an embodiment. FIG. 6 illustrates a diagram of an example screen 600 relating to a particular piece of product (e.g., a sample of product (e.g., soda bottle) on the conveyer belt) associated with the example portion of the control system in accordance with an embodiment of the disclosed subject matter.

As an example, a user can be an operator using a terminal to monitor and/or control operations relating to at least a portion of a control system. The user can enter authentication credentials into the terminal or other associated component, and upon validation of the authentication credentials, can be granted certain access rights to access a subset of screens and folders associated with the application, wherein the screens and folders can be organized in a desired hierarchical structure, as specified by the designer and/or modified by the user(s), in accordance with the user's access rights, which can be based at least in part on who the user is, role of the user, user group to which the user belongs, the application, and/or other criteria. The subset of screens available to the user can include, for example, screen 300, screen 400, screen 500, and screen 600.

Upon being authenticated, the interface component 104 can present the home screen, which can be, for example screen 300, to the user via a display on the interface component 104 of the terminal, wherein, for example, the screen 300 can be a main menu relating to the application associated with the portion of the control system monitored and/or managed by the user. The screen 300 (e.g., main menu) can provide the user with certain information, such as, for example, high-level status information relating to different functions or processes (e.g., blending, rapid mix, filling, labeling machine, packaging) of the control system portion, and/or controls that can facilitate controlling functions of the control system portion, accessing a certain screen (e.g., production dashboard) or folder, and/or accessing other information (e.g., diagnostic information).

In an aspect, if the user desires to access another screen, such as a dashboard screen (e.g., screen 400), the user can select (e.g., via touch screen, keyboard, mouse, voice, etc.) the production dashboard control 302 displayed on the interface component 104 to access the dashboard screen, or, if a control to select the dashboard screen is not available on the screen 300, the user can access a tool bar or menu, such as menu 200, for example, when displayed in a portion of the interface component 104, or as displayed in a portion of the interface component 104 in response to a user action (e.g., hover action, click in a region of the display, click on a favorites control 218 when the dashboard screen is in the favorites folder or menu, etc.). In response to selection of the dashboard screen (e.g., selection of a dashboard screen control), the dashboard screen (e.g., 400) can be accessed and displayed on the display screen of the interface component 104 on the terminal so it can be perceived by the user, wherein, for example, the dashboard screen can include parameter values, status indicators, or other information that can provide the user with other information (e.g., production data, order information, line speed, production by shift, etc.) relating to various part of the control system.

The user can or may desire to obtain information or monitor operations regarding a specific portion (e.g., conveyer belt) of the control system. In an aspect, in response to a user action (e.g., a hover or click action on the display screen), the menu (e.g., 200) can pop up or overlay on the screen 400, wherein the user can select a desired control to access a screen that can display information relating to the specific portion of the control system. For example, if the screen (e.g., 500) of the specific portion of the control system is in the favorites folder, the user can select or manipulate the favorites control 218, and can select the desired screen 500 in the list of screens in the favorites folder or menu, and the screen 500 can be accessed and displayed on the display of the interface component 104. As another example, if the screen 500 is in a folder for a specific room, such as Room B, the user can use the interface component 104 to select the Room B control 202, and the list of screens and/or folders for Room B can be displayed on the display of the interface component 104, and the user can select the screen 500 from the list to access and display the screen 500 of the specific portion of the control system.

If the user desires to drill down even further, for example, to obtain more detail regarding product on the line, such as contained on screen 600, the user can utilize the interface component 104 to navigate to a desired location in the hierarchy of folders and screens to where screen 600 is located and can select the screen 600 to access and display the screen 600 on the display of the interface component 104. For example, the screen 500 (e.g., showing a specific portion of the control system) can be located in the Room B folder (e.g., because that specific portion is located in Room B), and the Room B folder can include another folder (e.g., product sample folder) that can contain one or more items (e.g., still another folder, screen 600) that can be a level further down in the hierarchy than the screen 500. Using the interface component 104, the user can select the other folder to show the items, such as screen 600, contained in the other folder, and the user can select screen 600, which shows information relating to a sample of product in the specific portion of the control system.

In another aspect, if the user accidentally selects a wrong control (e.g., Room C control 204) to a folder that does not include the desired screen or if the user otherwise desires to navigate away from the current folder, the user can select the navigate control 214 in the menu 200, and, in response, the ESOC 102 can navigate away from the current folder to another level in the hierarchy, such as, for example, the next highest level in the hierarchy or to the previous screen accessed. In still another aspect, a status bar, tool bar, or menu (e.g., menu 200), which can be located in a desired region (e.g., top portion of the display, bottom portion of the display, side portion of the display, etc.) of the display, can include a forward navigation control (not shown in FIG. 2) and a backward navigation control (not shown in FIG. 2). The backward navigation control, when manipulated or selected, can navigate from the currently displayed item (e.g., screen) to the most previously displayed item and/or can provide a list containing a specified number of previously displayed items any of which can be selected by the user to navigate to the selected item. The forward navigation control, when manipulated or selected, can navigate from a currently displayed item to an item that had previously been displayed but had been navigated from to show the currently displayed item in the display. This can provide a streamlined interface that can allow the user to very quickly navigate back and forth between two items (e.g., screens) that are in distinctly different parts of the application.

Figure 7:
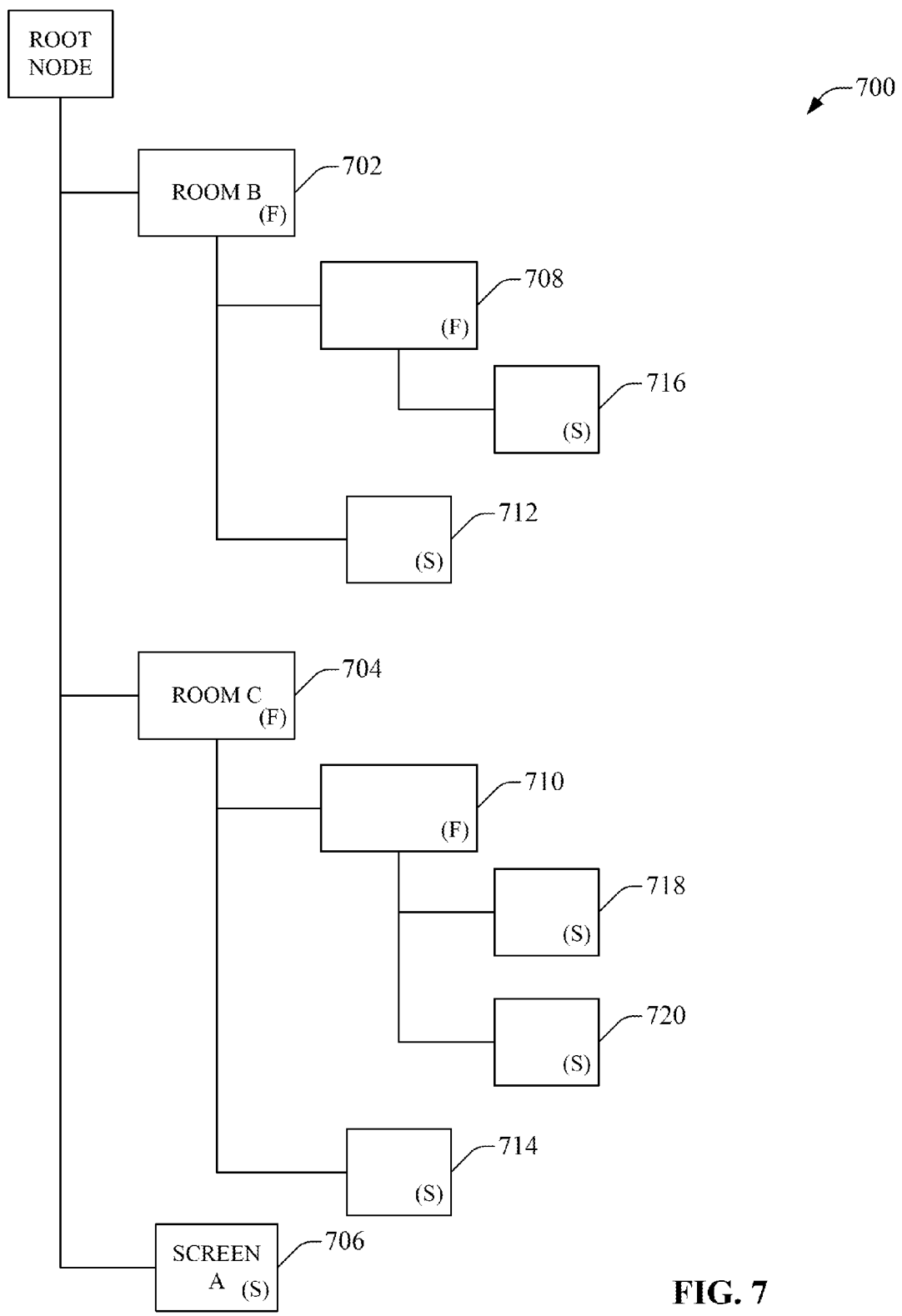
FIG. 7 depicts is a diagram of an example hierarchical item display in accordance with an embodiment.

Turning briefly to FIG. 7, depicted is a diagram of an example hierarchical item display 700 in accordance with an embodiment. In the hierarchical item display 700 can include a plurality of folders and a plurality of screens organized hierarchically in a desired order, for example, as structured during design time by the designer and/or as modified from the initial structure by a user, in accordance with the user's access rights. For instance, if desired, the hierarchical item display 700 can include a first or highest tier in the hierarchy that can comprise one or more folders, such as, for example, folder (F) 702 relating to Room B, folder 704 relating to Room C, and screen (S) 706 which can be Screen A, wherein the screen 706 can exist in the display 700 outside of a folder and/or also can be in another folder (e.g., favorites folder (not shown)). Per the example hierarchical item display 700, there can be a second or middle tier that can comprise items, such as folders 708 and 710, and screens 712 and 714, wherein folder 702 of the first tier can comprise folder 708 (e.g., relating to a particular operational aspect of Room B) and screen 712 relating to Room B, folder 704 of the first tier can comprise folder 710 (e.g., relating to certain operational aspects of Room C) and screen 714 relating to an operational aspect of Room C. Further, as desired, the hierarchical item display 700 can comprise a third or lower (e.g., lowest) tier, which can include items, such as screen 716, screen 718, and screen 720, wherein screen 716 can relate to a particular operational aspect associated with Room B and can be contained in folder 708 of the second tier, and screens 718 and 720 can relate to respective operational aspects of Room C and can be contained in folder 710.

It is to be appreciated and understood that the number of tiers in the hierarchy can be virtually any desired number (e.g., integer number), and the three tiers of the hierarchical item display 700 is but one example. It is to be further appreciated and understood that the arrangement of folders and screens, and/or other items, in the hierarchical item display 700 can be organized in virtually any manner desired in order to enable a user to efficiently (e.g., quickly) access the folders and screens to desirably monitor and/or manage control system operations, and the arrangement of folders and screens in the hierarchical item display 700 is but one example.

While the items (e.g., folders, screens, controls) can be represented by icons, such as generic icons, in the hierarchical item display 700, the disclosed subject matter is not so limited. For instance, in accordance with an embodiment, as desired, an icon for a particular screen can be desirably displayed as a thumbnail representation of the screen (e.g., a smaller-scaled depiction of the screen) with which the icon is associated. Also, it is to be appreciated and understood that the hierarchical arrangement of the hierarchical item display 700 is but one example of a hierarchical display of items, and other types of hierarchical displays are considered to be encompassed by the disclosed subject matter.

The disclosed subject matter, by employing the multi-tier hierarchical screen-folder structure having the navigation functionality, multi-tier arrangement of screens, folders and other items, home screen control, favorites control and menu, and other functional aspects, all as disclosed herein, can provide advantages over conventional operator interface navigation structures. The multi-tier hierarchical screen-folder structure of the disclosed subject matter is more efficient than a typical operator interface navigation structure that is defined as a hierarchy, wherein the user may navigate from one screen to another via a respective set of buttons that are defined on each screen, as in such an operator interface navigation structure, the operator is required to create a mental picture of the screen to screen navigation so the operator can remember how to get to the location he or she desires. This can be difficult to learn and remember and also limits where the operator can go because the operator typically has to navigate all the way back to the top of the hierarchy so that the operator can then drill down in a different direction(s) to try to locate the desired screen. The aspects of the disclosed subject matter can improve management and operation of the control system, reduce the amount of time needed to navigate between items (e.g., screens), reduce the amount of information regarding the location of items (e.g., screens, folders, controls, etc.) that a user is required to remember in order to effectively use an application, and desirably secure the terminal, application and control system, over conventional systems and methods.

Figure 8:
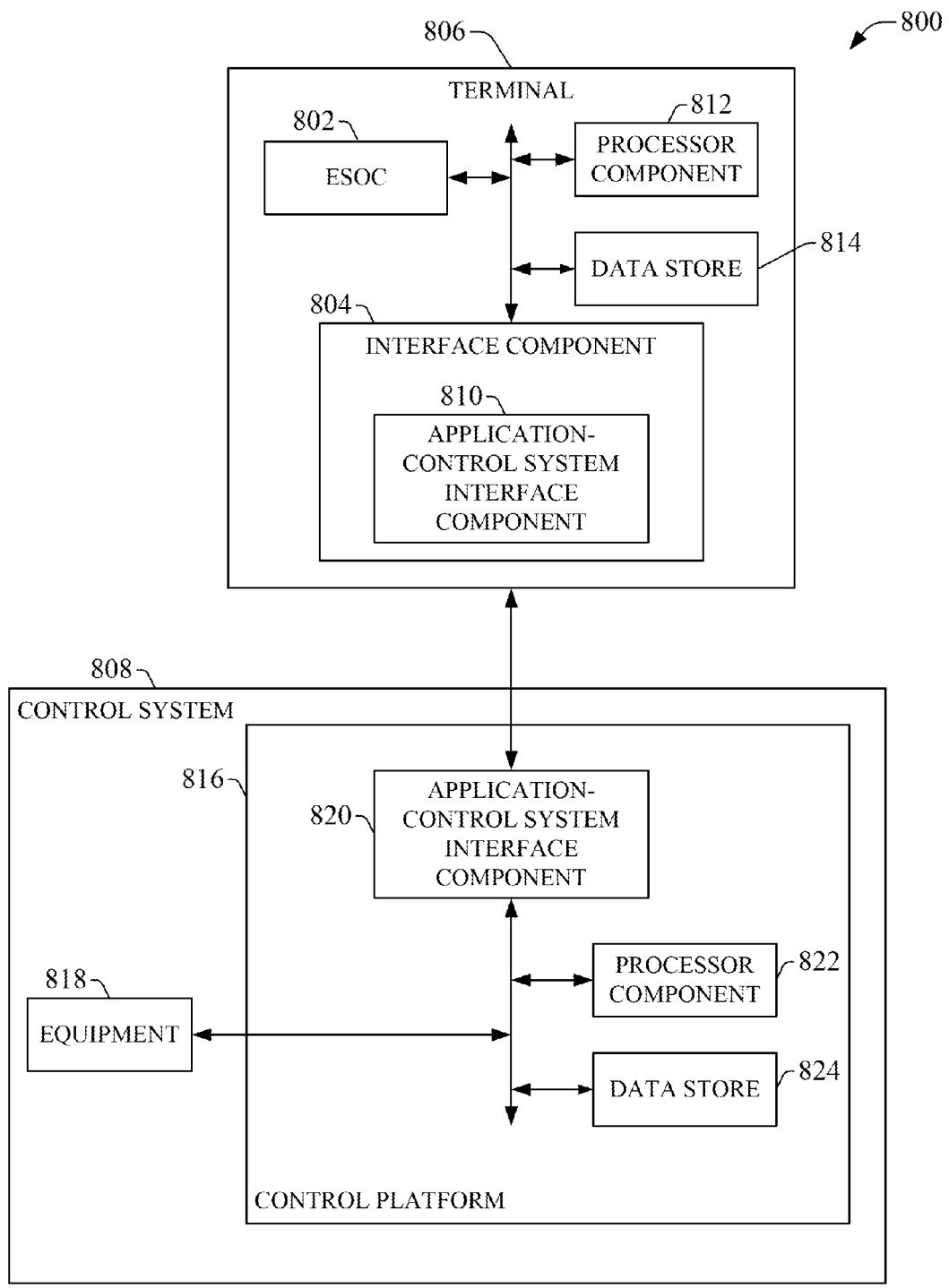
FIG. 8 is a block diagram that illustrates an example system that can employ a multi-tier screen-folder structure associated with an application to facilitate controlling a control system (e.g., industrial control system) in accordance with various aspects and embodiments.

FIG. 8 is a block diagram that illustrates an example system 800 that can employ a multi-tier screen-folder structure associated with an application to facilitate controlling a control system (e.g., industrial control system) in accordance with various aspects and embodiments. In an aspect, the system 800 can comprise ESOC 802 and an interface component 804, wherein the ESOC 802 and interface component 804 each can respectively can be the same or similar to, and/or can comprise the same or similar functionality as, respective components (e.g., respectively named components), as more fully disclosed herein.

In one aspect, the system 800 can comprise a terminal 806 that can include the ESOC 802 and interface component 804. The terminal 806 can be associated with (e.g., communicatively connected to) the control system 808 to facilitate monitoring and controlling the operations of the control system 808. The terminal 806 can be used during design time to facilitate organizing screens and folders to generate a multi-tier screen-folder structure for an application associated with the control system 808, and/or during run time to use the multi-tier screen-folder structure to facilitate monitoring and controlling operations of the control system 808. It is to be appreciated and understood that, in accordance with other embodiments, a different terminal (not shown) or device (not shown) can be employed during design time to facilitate organizing screens and folders to generate a multi-tier screen-folder structure for an application associated with the control system 808, and information (e.g., code or other data) can be stored on a computer-readable medium, and such information can be input to the terminal 806 to facilitate using the terminal 806 during run time to monitor and control operations of the control system 808.

In an aspect, the interface component 804 can include and/or provide one or more displays or monitors, such as a cathode ray tube (CRT) monitor, a Liquid Crystal Display (LCD) monitor, a plasma monitor, a light emitting diode (LED) monitor, an electrochromic monitor, or the like, to facilitate displaying information and/or items (e.g., screens, folders, controls, icons, etc.) to a user. The interface component 804 also can employ an application-control system interface component 810 that can include various adapters, connectors, controls, channels, ports, communication paths, etc., to facilitate connecting the terminal 806 to other components, devices, or systems, such as control system 808, and communication of information between the terminal 806 and other components, devices, or systems, such as control system 808. In an aspect, the terminal 806 also can be functionally coupled (e.g., communicatively coupled) with a server (not shown) that is part of a platform (factory, plant, oil rig, etc.) that includes the control system 808. In another aspect, an access network(s) can be geographically distributed and can include one or more of a wireline network or a wireless network that operate in accordance with one or more protocols—for example, packet-based protocols such as internet protocol (IP), transmission control protocol (TCP), Ethernet, Ethernet TCP/IP, Control and Information Protocol (CIP) also referred to as Ethernet/IP, X.25, Asynchronous Transfer Mode (ATM) protocol, frame-based protocols such as frame relay, and circuit-switched protocols). In still another aspect, if desired, utilizing the access network(s), one or more remote access techniques can be employed to run (e.g., operating, managing, utilizing) or at least facilitate running the application. When the one or more remote access techniques are used to run the application, the interface component 804 can or may exist on the terminal 806, but, additionally or alternatively, a remote thin client (e.g., an application control-type device) or another terminal can be connected to the terminal 806 via, for example, a wireline or wireless communication network (e.g., an IP-based network (e.g., the Internet, an intranet)), as more fully disclosed herein, wherein the remote thin client or other terminal can be providing visualization, user feedback, or other desired functionality, for using (e.g., enabling a user to use remotely) a menu or other item (e.g., screen) provided by the ESOC 102 and/or presented by the interface component 804.

In another aspect, the interface component 804 can provide one or more graphical user interfaces (GUIs), command line interfaces, and the like. For example, a GUI (e.g., touch screen GUI) can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. In still another aspect, the interface component 804 can receive and/or respond to a swipe gesture(s) (e.g., via a touch screen GUI), wherein a desired action (e.g., unlocking of the terminal 806 or associated display, scrolling through a menu, moving from one area of a displayed item, such as a screen, to another area of that item, adjusting the size of a displayed item, etc.). For instance, a displayed menu or screen can be sized such that it is larger than the display screen of the interface component 804. The interface component 804 can receive a particular swipe gesture via the touch screen GUI, and in response, the menu can be scrolled to display different menu items, including items that were previously outside of the display area, or a different portion of the screen can be displayed, such as a region of the screen that was previously not viewable on the display prior to the swipe gesture. Alternatively or additionally, a mouse can be used to click and drag on the screen to move the screen in the display so that the desired portion of the screen is displayed on the display; or one or more buttons (e.g., ctrl button+an arrowed or directional button) on a keyboard can be manipulated to move the screen in the display so that the desired portion of the screen is displayed on the display. In an aspect, the user can interact with one or more of the components coupled to and/or incorporated into a processor (e.g., host processor) of the processor component 810.

The user can also interact with the regions to select and provide information via various devices such as a mouse, a roller ball, a keypad, a track pad, a keyboard, a pen and/or voice activation, for example. Typically, a mechanism such as a push button or the enter key on the keyboard can be employed subsequent entering the information in order to initiate the search. However, it is to be appreciated that the disclosed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI, HMI, and/or API. In addition, the command line interface can be employed in connection with hardware (e.g., video cards) and/or displays (e.g., black and white, and EGA) with limited graphic support, and/or low bandwidth communication channels.

Further, the interface component 804 can include or can be associated with a scanner that can receive data (e.g., authentication credentials, user data, etc.) from other components (e.g., host processor) of system 800. The scanner can be a type whereby a device (e.g., smart card) containing the data can be swiped through the scanner, which can read data associated with the device and/or the scanner can be a wireless scanner (e.g., RFID-type scanner) that can receive or read data associated with a device that contains the data when the device is within a predefined area near the wireless scanner such that the wireless scanner is able to communicate with the device to read or receive the data from the device.

In an aspect, the processor component 812 can operate in conjunction with the other components (e.g., ESOC 802, interface component 804, etc.) of the terminal 806 to facilitate performing the various functions of the terminal 806. The processor component 812 can employ one or more processors, microprocessors, or controllers that can process data, such as information relating to creating a multi-tier design structure of screens and folders, organizing screens and folders in relation to each other in the structure, controlling access to the screens and folders, maintaining security of the terminal, application, control system and data communications, monitoring and/or controlling the control system using the application and associated multi-tier design structure, controlling access rights, controlling communication of data between the terminal 806 and other components (e.g., control system 808, etc.), etc., information relating to other operations of the system 800, and/or other information, etc., to facilitate operation of the terminal 806, as more fully disclosed herein, and control data flow between the terminal 806 and other components (e.g., control system 808, etc.) associated with the terminal 806.

The terminal 806 also can contain a data store 814 that can store data structures (e.g., user data, code, control data, metadata), code structure(s) (e.g., modules, objects, hashes, classes, procedures) or instructions, information relating to creating a multi-tier design structure of screens and folders, organizing screens and folders in relation to each other in the structure, controlling access to the screens and folders, maintaining security of the terminal, application, control system and data communications, monitoring and/or controlling the control system using the application and associated multi-tier design structure, controlling access rights, controlling communication of data between the terminal 806 and other components (e.g., control system 808), etc., to facilitate controlling operations associated with the terminal 806. In an aspect, the processor component 812 can be functionally coupled (e.g., through a memory bus) to the data store 814 in order to store and retrieve information desired to operate and/or confer functionality, at least in part, to the components of the terminal 806 (e.g., ESOC 802, interface component 804, etc.), and/or substantially any other operational aspects of the terminal 806.

In still another aspect, the control system 808 can include a control platform 816 that can be employed to facilitate monitoring and controlling operations in the control system 808. The control platform 816 can comprise a processor component 822 that can operate in conjunction with the other components (e.g., equipment 818, application-control system interface component 820, etc.) of the control system 808 to facilitate performing the various functions of the control system 808. The processor component 822 can employ one or more processors, microprocessors, or controllers that can process control code to facilitate performance of operations of the control system 808, and data, such as information relating to operating conditions or parameters of the control system 808, alarm information, information relating to communication of data between the control system 808 and the terminal 806 (or other components), etc., information relating to other operations of the control system 808, and/or other information, etc., to facilitate operation of the control system 808, as more fully disclosed herein, and control data flow between the control system 808 and other components (e.g., terminal 806, etc.) associated with the control system 808.

In accordance with various embodiments, a controller in the control platform 816 can be embodied in a programmable automation controller (PAC), which can be a dedicated programmable logic controller (PLC); a PC-based controller; or the like. The terminal 806 can communicate with the controller and/or other devices, such as an input/output (I/O) module, drives, motion controllers, process instruments, sensors, etc., in or associated with the control platform 816. Control code and control data structures in the control platform 816 can represent control logic that can administer equipment 818, and related processes, functionally coupled to the control platform 816. In an aspect, control platform 816 is an industrial automation control environment and the control logic is automation control logic. To facilitate operation of the control system 808, control logic can be developed during design time, wherein the control logic can be implemented (e.g., executed) at run time. During design time (e.g., in the design environment), in an aspect, instruction(s), data type(s), and metadata tag(s) that comprise control code can be produced and retained as part of configuration, or composition, of a control project or application for use in operations for the control system 808 (e.g., during run time).

In yet another aspect, the equipment 818 of the control system 808 can comprise various components or devices (e.g., conveyer belt, material distributor, mixer, measurement component, extraction component, etc.) that can perform associated process(es) (e.g., industrial process(es), manufacturing process(es), measurement process(es) in a laboratory, infrastructure development process(es), such as oil and gas prospecting and extraction, etc.). The equipment 818 generally can be specific to a production process and related market space(s) (e.g., beverages, edible goods, textile goods, oil and gas, etc.) and can include one or more sets of tools, a group of machines, numerous systems and related sub-systems, real estate and associated infrastructure, and so forth.

In still another aspect, the control platform 816 also can include an application-control system interface component 820 that can include various adapters, connectors, controls, channels, ports, communication paths, etc., to facilitate connecting the control system 808 to other components, systems or devices, such as the terminal 806 and equipment 818, and communication of information (e.g., control data or code to facilitate controlling operation of the control system 808, information relating to operation of the control system 808, etc.) between the control system 808 and other components, systems, or devices, such as the terminal 806 and equipment 818.

The control system 808 also can contain a data store 824 that can store data structures (e.g., control code or data, data relating to operations of the control system 808, metadata, etc.), code structure(s) (e.g., modules, objects, hashes, classes, procedures) or instructions, information relating to operating conditions or parameters of the control system 808, alarm information, information relating to communication of data between the control system 808 and the terminal 806 (or other components), etc., to facilitate controlling operations associated with the control system 808. In an aspect, the processor component 822 can be functionally coupled (e.g., through a memory bus) to the data store 824 in order to store and retrieve information desired to operate and/or confer functionality, at least in part, to the components of the control system 808 (e.g., equipment 818, application-control system interface component 816, etc.), and/or substantially any other operational aspects of the control system 808.

Figure 9:
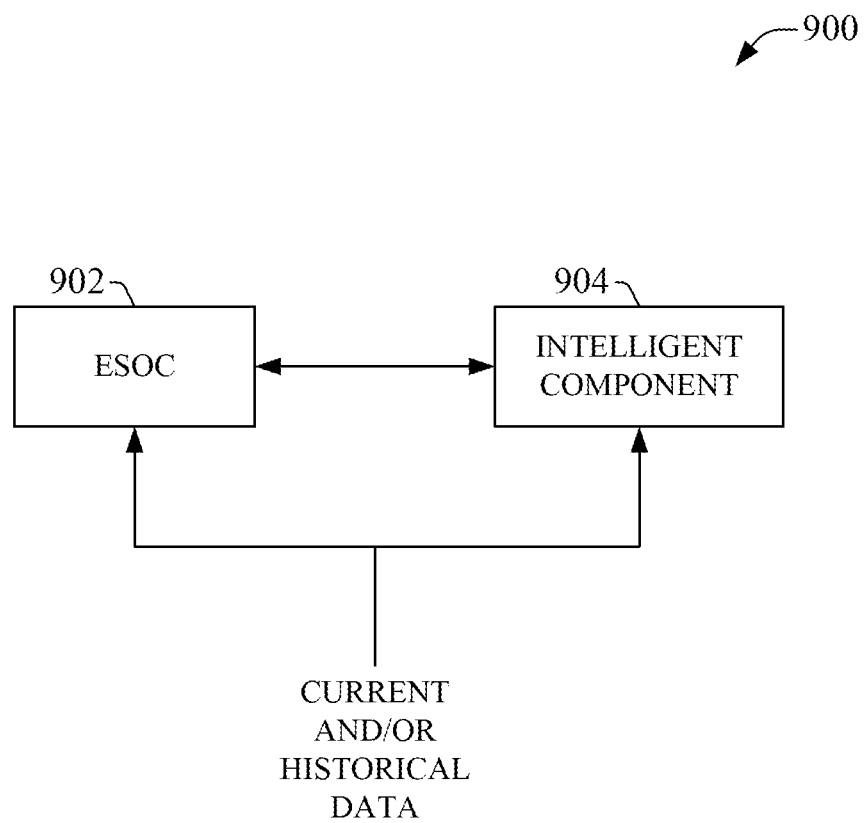
FIG. 9 presents a block diagram of an example system that can employ intelligence to facilitate efficiently organizing and controlling access to screens (e.g., application or control system screens) associated with a control system in accordance with various aspects and embodiments.

FIG. 9 presents a block diagram of an example system 900 that can employ intelligence to facilitate efficiently organizing and controlling access to screens (e.g., application or control system screens) associated with a control system in accordance with various aspects and embodiments. The system 900 can include an ESOC 902 that can be employed to facilitate organizing screens and folders in a multi-tier design structure, and controlling access to the screens and folders, among other functions, as more fully disclosed herein, to facilitate monitoring and controlling operations of an associated control system.

The ESOC 902 can be associated with an intelligent component 904 that can utilize artificial intelligence (AI) techniques or methods to infer (e.g., reason and draw a conclusion based at least in part on a set of metrics, arguments, or known outcomes in controlled scenarios) an automated response to perform in response to an inference(s); at least a portion of a multi-tier organization of screens and folders for an application associated with a control system; whether a screen is to be identified as a favorite screen; which screen of a plurality of screens is most suitable to be a home screen in relation to a user, a role, or a user group; a desired filtering of screens and folders to generate a subset of screens and folders to be presented in relation to a subset of access rights; a next item (e.g., screen) that a user is expected to access next; etc. Artificial intelligence techniques typically can apply advanced mathematical algorithms—e.g., decision trees, neural networks, regression analysis, principal component analysis (PCA) for feature and pattern extraction, cluster analysis, genetic algorithm, and reinforced learning—to historic and/or current data associated with the systems and methods disclosed herein to facilitate rendering an inference(s) related to the systems and methods disclosed herein.

In particular, the intelligent component 904 can employ one of numerous techniques or methods for learning from data and then drawing inferences from the models so constructed, e.g., Hidden Markov Models (HMMs) and related prototypical dependency models. General probabilistic graphical models, such as Dempster-Shafer networks and Bayesian networks like those created by structure search using a Bayesian model score or approximation can also be utilized. In addition, linear classifiers, such as support vector machines (SVMs), non-linear classifiers like methods referred to as "neural network" methodologies, fuzzy logic methodologies can also be employed. Moreover, game theoretic models (e.g., game trees, game matrices, pure and mixed strategies, utility algorithms, Nash equilibria, evolutionary game theory, etc.) and other approaches that perform data fusion, etc., can be exploited in accordance with implementing various automated aspects described herein. The foregoing techniques or methods can be applied to analysis of the historic and/or current data associated with systems and methods disclosed herein to facilitate making inferences or determinations related to systems and methods disclosed herein.

Figure 10:
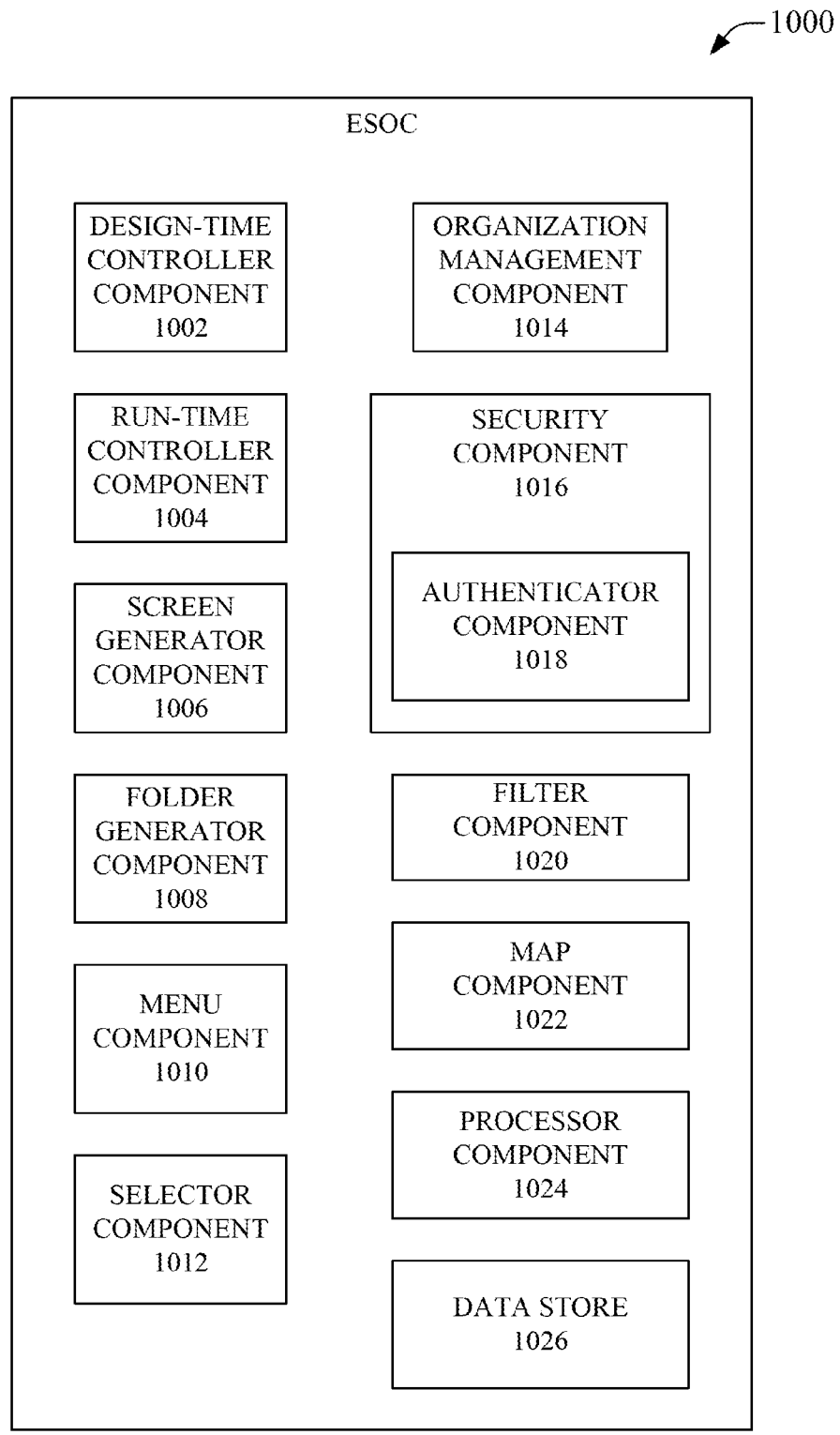
FIG. 10 illustrates a block diagram of an example enhanced screen organizer component (ESOC) in accordance with various embodiments and aspects.

FIG. 10 illustrates a block diagram of an example ESOC 1000 in accordance with various embodiments and aspects. In an aspect, the ESOC 1000 can include a design-time controller component 1002 that can facilitate controlling access to and presentation of items (e.g., screens, folders, controls, interfaces, etc.) during design time to facilitate arranging folders and screens in relation to each other in a multi-tier design structure, providing and arranging desired controls (e.g., navigation control, folder control, screen control, home control, favorites control, etc.) to a user for use during run time, providing one or more menus for use during run time, setting respective access rights of respective users, user groups or roles, setting of home screens, preconfiguring a set of favorite screens, etc. In another aspect, the ESOC 1000 can contain a run-time controller component 1004 that can that can facilitate controlling access to and presentation of items (e.g., screens, folders, controls, interfaces, etc.) during run time to facilitate providing or presenting folders and screens in relation to each other in accordance with the multi-tier design structure, providing and arranging desired controls (e.g., navigation control, folder control, screen control, home control, favorites control, etc.) for use during run time, providing one or more menus for use during run time, setting or selecting a home screen, selecting screen as a favorite screen, etc.

In still another aspect, the ESOC 1000 can comprise a screen generator component 1006 that can be employed to generate a screen that can be representative of a portion of a control system to facilitate monitoring and controlling operations of that portion of the control system using (e.g., interfacing or interacting with) that screen. Respective screens of respective portions or aspects of the control system can be generated such that all or a desired portion of the control system can be monitored and controlled using the screens, in accordance with the multi-tier design structure, as generated during design time. In yet another aspect, the ESOC 1000 can include a folder generator component 1008 that can be employed to generate one or more folders, wherein one or more screens, folders, or other items can be stored or contained in a folder.

In an aspect, the ESOC 1000 can comprise a menu component 1010 that can be utilized to generate one or more menus, including, for example a context menu and/or a long-press context menu, when can be provided or presented to a user (e.g., an operator, supervisor) during run time to facilitate navigating between various items, selecting a screen as a home screen or a favorite screen, and/or performing other desired functions during run time. For a given menu, the menu component 1010 can include icons and associated controls that can be representative of and/or can facilitate access of respective screens, folders, or other items, as presented in the multi-tier design structure. In still another aspect, the ESOC 1000 can contain a selector component 1012 that can be utilized to select items, for example, in response to user activity (e.g., mouse click, screen touch, key stroke, control manipulation, voice command, etc.), to access or open the selected item or perform an operation associated with the selected item.

The ESOC 1000 also can include an organization management component 1014 that can be utilized to facilitate arranging and presenting screens, folders, and/or other items in a multi-tier design structure (e.g., as specified by the designer). The organization management component 1014 can provide functions and controls that can facilitate creating a multi-tier design structure and arranging items (e.g., screens, folders) in relation to each other in the multi-tier design structure in accordance with the predefined organization criteria.

In yet another aspect, the ESOC 1000 can comprise a security component 1016 that can be employed to secure access to a terminal, an application and associated control system, and/or screens and folders, in accordance with access rights of a user. The security component 1016 also can facilitate creating secure communication channels for secure communication of data and/or encrypting data for communication and decrypting received data, in accordance with desired secure communication protocols. (e.g., hypertext transfer protocol secure (HTTPS), secure sockets layer (SSL) protocol, data encryption standard (DES)-type algorithms, advanced encryption standard (AES)-type algorithms, symmetric key algorithms, etc.).

The security component 1016 can include an authenticator component 1018 that can be employed to authenticate or verify users attempting to access the terminal and/or application associated with the control system. The authenticator component 1018 can receive authentication credentials from a user via the interface component and can compare the received authentication credentials to stored valid authentication credentials to determine whether the received authentication credentials are valid and, if so, to facilitate identifying a subset of access rights that can be granted to an authenticated user. If the received authentication credentials match any of the stored valid authentication credentials, the received authentication credentials can be identified as valid and the user can be deemed authenticated. If the received authentication credentials do not match any of the stored valid authentication credentials, the authenticator component 1018 can determine that the received authentication credentials are not valid and the security component 1016 can deny the user access to the terminal and/or application. In such instance, the security component 1016 can facilitate prompting the user to attempt to provide valid authentication credentials up to a predefined maximum number of access attempts, wherein, if the maximum number of attempts is reached without valid authentication credentials being presented, further attempts to access the terminal or application can be denied for at least a predefined amount of time and/or a notification of the authentication failure can be communicated to a desired entity (e.g., plant manager, supervisor, security person, etc.).

In an aspect, when the received authentication credentials are determined to be valid, the security component 1016 can identify a subset of access rights that can be granted to the user to access the terminal and/or application, including a subset of screens and folders, based at least in part on a mapping of the received valid authentication credentials to access rights, which can be stored in the data store 1026. The user can access the subset screens and folders of the multi-tier design structure, but can be restricted from accessing other screens and folders that are not in the subset, in accordance with the access rights granted to the user.

In still another aspect, the ESOC 1000 can contain a filter component 1020 that can be used to filter the set of screens and folders of the multi-tier design structure to identify or generate the subset of screens and folders that can be made available to the authenticated user. The access rights and associated subset of screens and folders can be based at least in part on the user, role (e.g., operator, supervisor, etc.) of the user in relation to the control system, user group to which the user belongs, etc. In yet another aspect the ESOC 1000 can include a map component 1022 that can include desired mappings relating to an application and associated control system. The mappings can comprise, for example, a mapping of authentication credentials to a subset of access rights, map a subset of access rights to a user, role or user group, map an icon or control to an item (e.g., screen, folder, etc.), portion of a screen, a function or an aspect associated with the control system, etc.

In an aspect, the ESOC 1000 can comprise a processor component 1024 that can operate in conjunction with the other components (e.g., design-time controller component 1002, run-time controller component 1004, screen generator component 1006, etc.) of the ESOC 1000 to facilitate performing the various functions of the ESOC 1000. The processor component 1024 can employ one or more processors, microprocessors, or controllers that can process data, such as information relating to creating a multi-tier design structure of screens and folders, organizing screens and folders in relation to each other in the structure, controlling access to the screens and folders, maintaining security of the terminal, application, control system and data communications, monitoring and/or controlling the control system using the application and associated multi-tier design structure, controlling access rights, controlling communication of data between the ESOC and other components (e.g., interface component, control system, etc.), etc., information relating to other operations of the ESOC 1000, and/or other information, etc., to facilitate operation of the ESOC 1000, as more fully disclosed herein, and control data flow between the ESOC 1000 and other components (e.g., interface component, control system, etc.) associated with the ESOC 1000.

The ESOC 1000 also can contain a data store 1026 that can store data structures (e.g., user data, code, control data, metadata), code structure(s) (e.g., modules, objects, hashes, classes, procedures) or instructions, information relating to creating a multi-tier design structure of screens and folders, organizing screens and folders in relation to each other in the structure, controlling access to the screens and folders, maintaining security of the terminal, application, control system and data communications, monitoring and/or controlling the control system using the application and associated multi-tier design structure, controlling access rights, controlling communication of data between the ESOC 1000 and other components (e.g., interface component, control system, etc.), etc., to facilitate controlling operations associated with the ESOC 1000. In an aspect, the processor component 1024 can be functionally coupled (e.g., through a memory bus) to the data store 1026 in order to store and retrieve information desired to operate and/or confer functionality, at least in part, to the components of the ESOC 1000 (e.g., design-time controller component 1002, run-time controller component 1004, screen generator component 1006, etc.), and/or substantially any other operational aspects of the ESOC 1000.

In view of the example systems described above, example methods that can be implemented in accordance with the disclosed subject matter can be better appreciated with reference to flowcharts in FIGS. 11-16. For purposes of simplicity of explanation, various methods disclosed herein are presented and described as a series of acts; however, it is to be understood and appreciated that the subject disclosure is not limited by the order of acts, as some acts may occur in different order and/or concurrently with other acts from that shown and described herein. It is noted that not all illustrated acts may be required to implement a described method in accordance with the subject specification. In addition, for example, one or more methods disclosed herein could alternatively be represented as a series of interrelated states or events, such as in a state diagram. Moreover, interaction diagram(s) or call flow(s) represent several of the example methods disclosed herein in accordance with the described subject matter; particularly in instances when disparate entities, or functional elements, enact disparate portions of one or more of the several methods. Furthermore, two or more of the disclosed example methods can be implemented in combination, to accomplish one or more features or advantages described in the subject disclosure.

Figure 11:
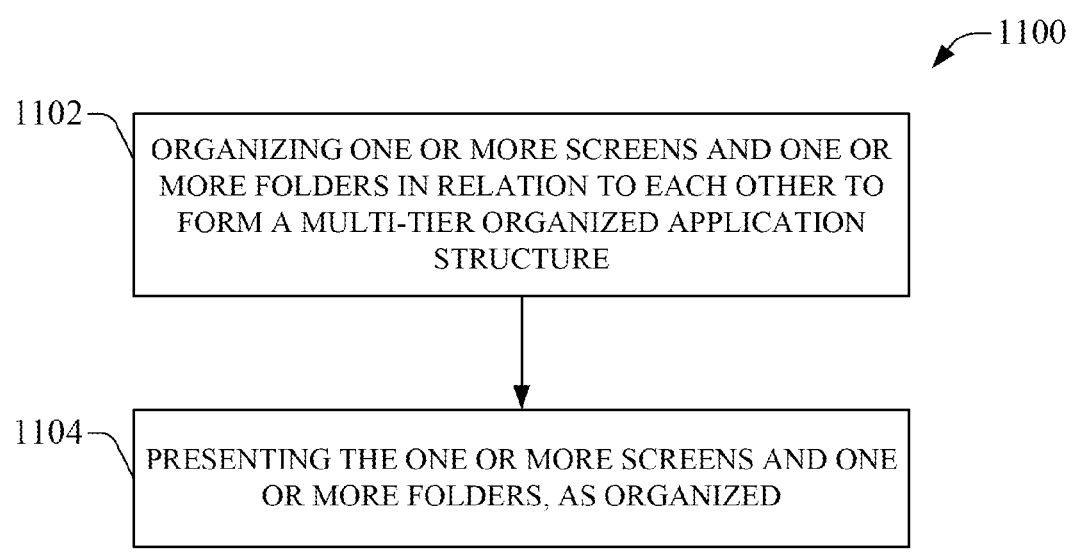
FIG. 11 presents a flowchart of an example method for organizing and presenting folders and screens in accordance with various aspects and embodiments of the disclosed subject matter.

FIG. 11 is a flowchart of an example method 1100 for organizing and presenting folders and screens (e.g., operator interfaces) in accordance with various aspects and embodiments of the disclosed subject matter. At 1102, one or more screens and one or more folders can be organized in relation to each other to form a multi-tier organized application structure. The screens and folders of the multi-tier (e.g., multi-level) organized application structure can be associated with an application used to facilitate monitoring and managing a control system. A screen can comprise certain information relating to the control system, wherein the information provided by the screen can change dynamically over time, for example, as changes in the control system occur. In an aspect, one or more folders can be created, wherein one or more screens can be stored or contained in a folder. In another aspect, there can be a desired number of tiers in the multi-tier hierarchical arrangement of screens and folders. For example, there can be a first folder that comprises a second folder, wherein the first folder can be part of the first (highest) tier and the second folder can be a second (lower) tier in the multi-tier hierarchical arrangement.

At 1104, the one or more screens and one or more folders, as organized, can be presented. For instance, the multi-tier hierarchical arrangement of screens and folders (e.g., multi-level organized application structure or multi-tier design structure), as organized, for example, by a designer, can be presented to a user via a display of an interface component of a terminal.

Figure 12:
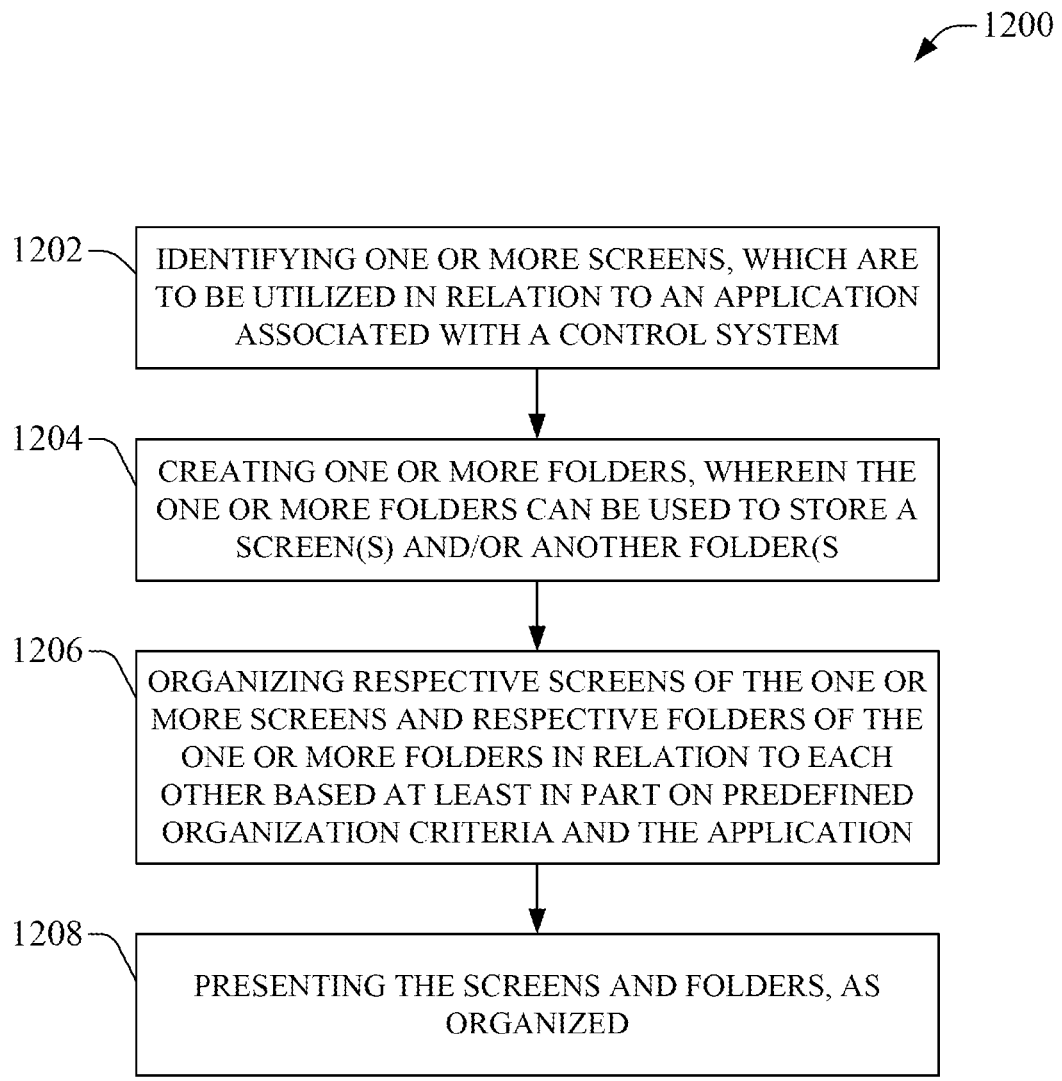
FIG. 12 illustrates a flow diagram of an example method for organizing folders and screens in a multi-tier hierarchical structure during design time in accordance with various aspects and embodiments of the disclosed subject matter.

FIG. 12 presents a flowchart of example method 1200 for organizing folders and screens in a multi-tier hierarchical structure during design time in accordance with various aspects and embodiments of the disclosed subject matter. At 1202, one or more screens, which are to be utilized in relation to an application associated with a control system, can be identified. At 1204, one or more folders can be created, wherein the one or more folders can be used to store a screen(s) and/or another folder(s). At 1206, respective screens of the one or more screens and respective folders of the one or more folders can be organized in relation to each other based at least in part on predefined organization criteria and the application. In an aspect, a user, such as a designer, can organize the folders and screens in relation to each other so that when other users, such as operations or supervisors, are using the application during run time, the screens and folders will be presented in a desirable (e.g., efficient, optimal) manner so that they can be easily accessed by the users. The screens and folders also can be arranged in accordance with the role of the user, user group, or other desired criteria.

In another aspect, when organizing the screens and folders, the designer can select or assign a screen as a home screen (e.g., global home screen, and/or a specific home screen for a role, user, or group, etc.). The designer also can select or assign a set of favorite screens for a user, group, role, etc.

At 1208, the screens and folders, as organized, can be presented. For example, when a user is accessing a terminal associated with the control system, the screens and folders, as previously organized, can be presented to the user via a display of the interface component of the terminal.

Figure 13:
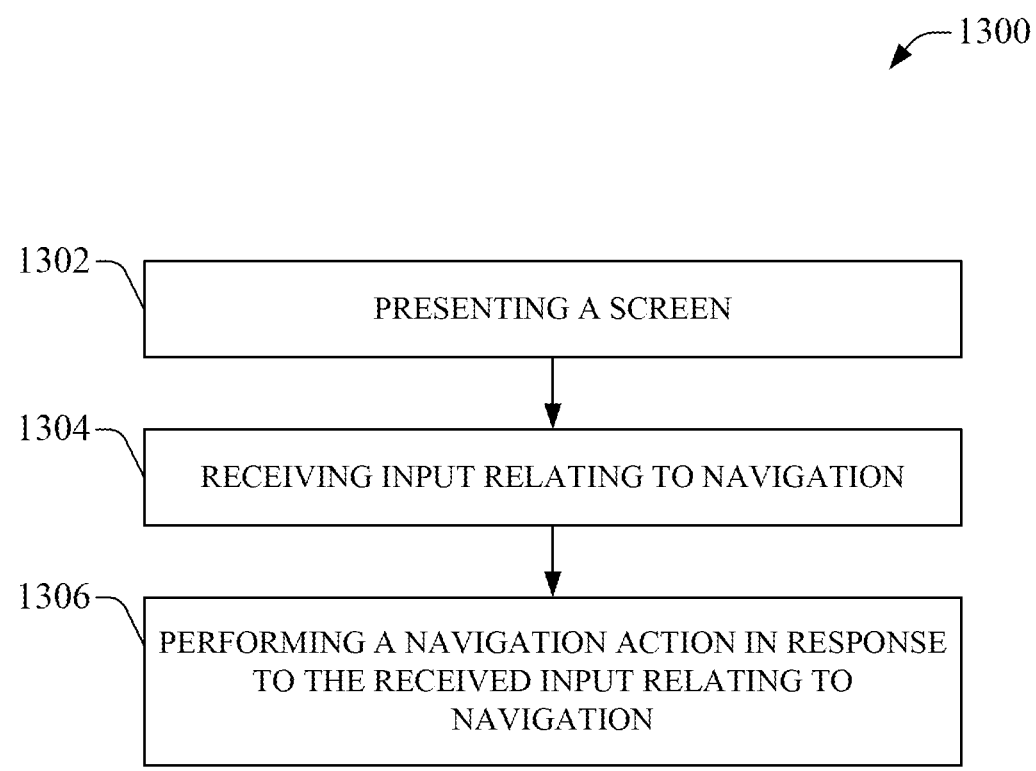
FIG. 13 illustrates a flow diagram of an example method for associating automation control logic to a display object according to aspects of the subject disclosure.

FIG. 13 illustrates a flowchart of an example method 1300 for navigating a subset of organized folders and screens in a multi-tier hierarchical structure in accordance with aspects of the disclosed subject matter. At 1302, a screen can be presented. For example, upon opening or accessing an application associated with a control system on a terminal, a home screen can be presented on a display of the interface component of the terminal to a user. A current screen also can be a screen other than the home screen. For instance, while using the application, a user also can navigate between screens available from the multi-tier arrangement of screens and folders associated with the application, in accordance with access rights of the user.

At 1304, input relating to navigation can be received. For instance, input to the interface component can indicate that the user is manipulating the navigation control (e.g., mouse click on the navigation control, touching the navigation control on the touch screen, keyboard stroke(s) to select the navigation control, etc.). At 1306, a navigation action can be performed in response to the received input relating to navigation. For instance, in response to manipulating the navigation button, the ESOC can navigate away from the currently displayed screen to another screen and/or a different tier in the multi-tier structure. For example, the ESOC can navigate from the current screen to the next highest tier above the tier in which the currently displayed screen resides, wherein the next highest tier can comprise the folder in which the currently displayed screen resides, one or more other folders, and/or one or more other screens.

Figure 14:
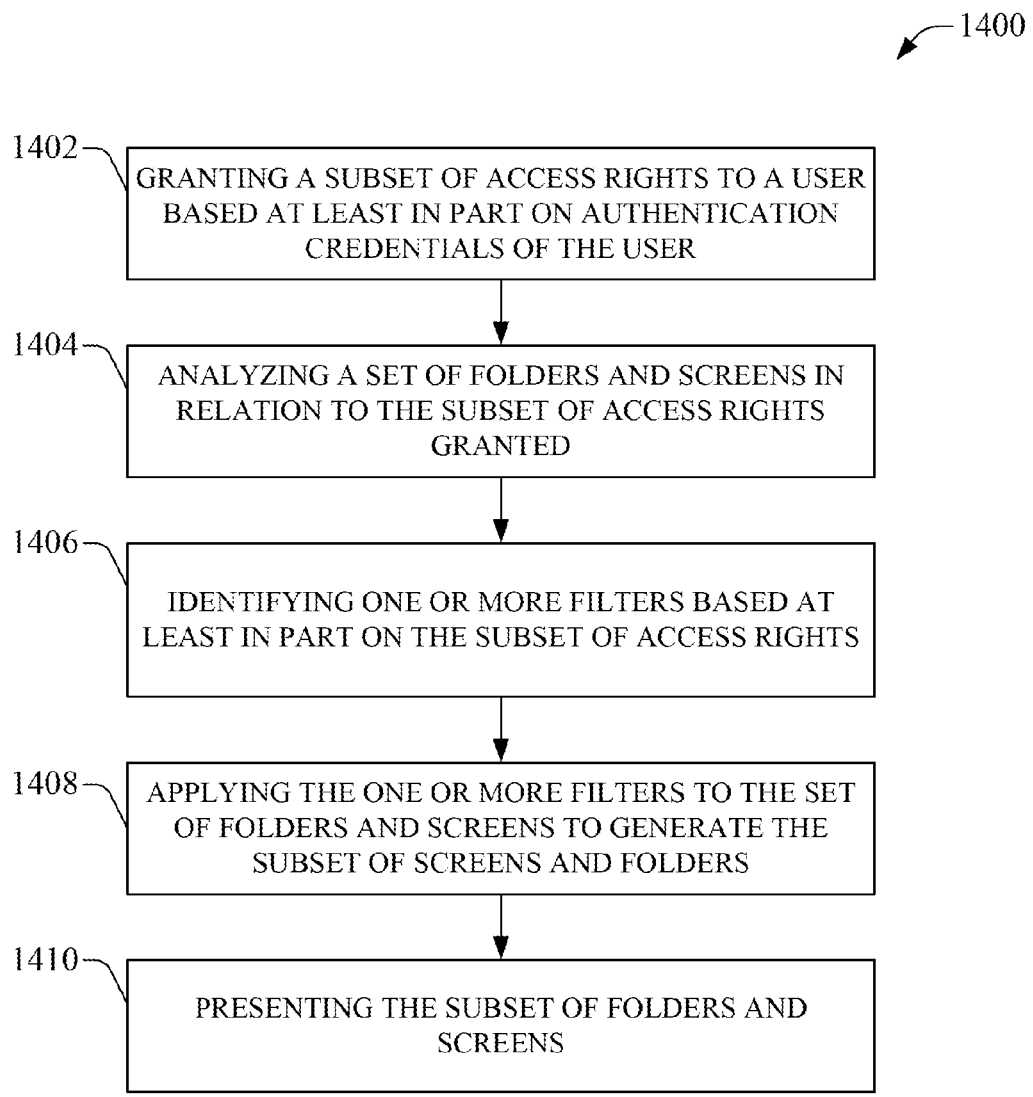
FIG. 14 presents a flow diagram of an example method for filtering folders and screens to generate a subset of organized folders and screens in a multi-tier hierarchical structure in accordance with aspects of the disclosed subject matter.

FIG. 14 is a flowchart of an example method 1400 for filtering folders and screens to generate a subset of organized folders and screens in a multi-tier hierarchical structure in accordance with aspects of the disclosed subject matter. At 1402, a subset of access rights can be granted to a user based at least in part on authentication credentials of the user. At 1404, a set of folders and screens can be analyzed in relation to the subset of access rights granted. The folders and screens in the set can be organized in a desired arrangement in relation to each other in the multi-tier hierarchical structure, for example, during design time and/or as modified during run time, in accordance with access rights.

At 1406, one or more filters can be identified based at least in part on the subset of access rights. In an aspect, the ESOC can identify one or more filters to facilitate filtering the set of folders and screens to generate a subset of folders and screens that are allowed to be accessed by the user, in accordance with the access rights granted. At 1408, the one or more filters can be applied to the set of folders and screens to generate the subset of screens and folders. At 1410, the subset of folders and screens can be presented. For example, the subset of folders and screens, as organized in accordance with predefined organization criteria, can be presented to the user via a display of the interface component of a terminal.

Figure 15:
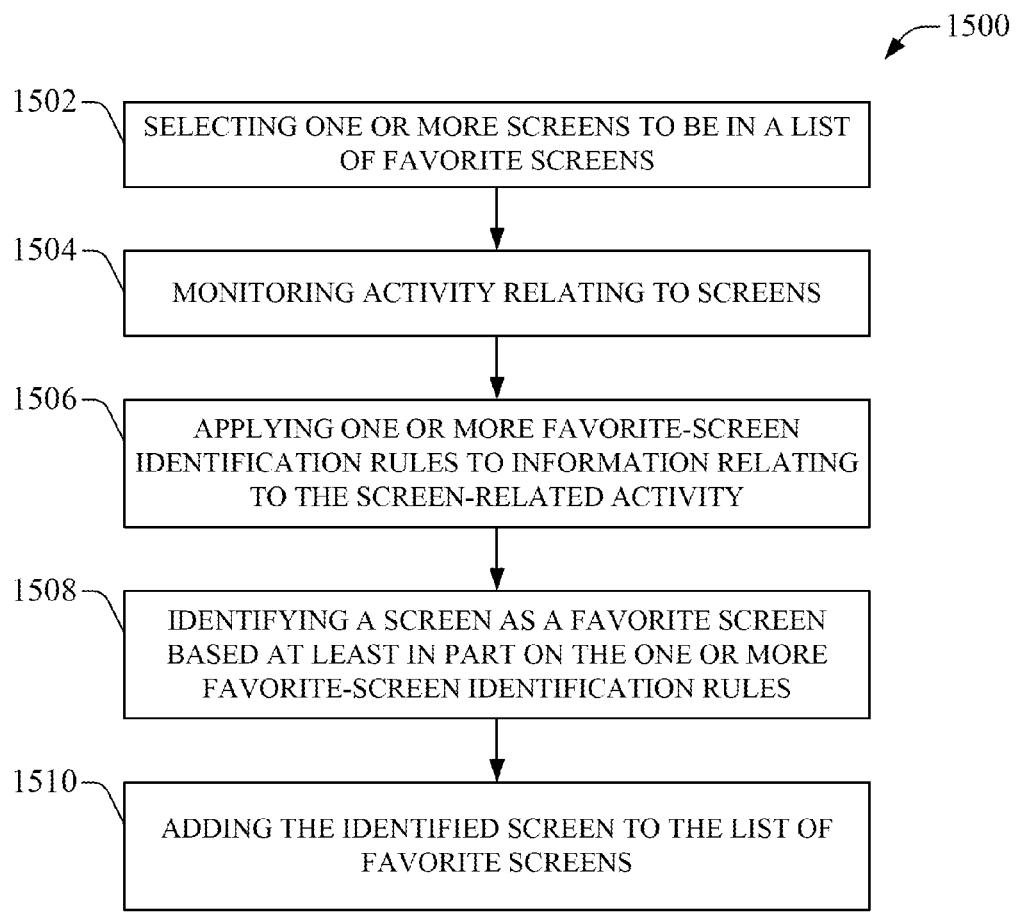
FIG. 15 depicts a flow diagram of an example method for identifying favorite screens for presentation in association with a multi-tier hierarchical structure in accordance with aspects of the disclosed subject matter.

FIG. 15 is a flowchart of an example method 1500 for identifying favorite screens for presentation in association with a multi-tier hierarchical structure in accordance with aspects of the disclosed subject matter. At 1502, one or more screens can be selected to be in a list of favorite screens. The list of favorite screens can be contained in a favorites menu or favorites folder, for example. At 1504, activity relating to screens can be monitored. For instance, screen-related activity, such as accessing of screens, can be monitored by the ESOC.

At 1506, one or more favorite-screen identification rules can be applied to information relating to the screen-related activity. In an aspect, the ESOC can apply a subset of favorite-screen identification rules to the information relating to the screen-related activity. The subset of favorite-screen identification rules can specify, for example, that a predefined number of most recently accessed screens can be added to or maintained on the list of favorite screens, or the most frequently accessed screens over a predefined period of time (e.g., 1 hour, . . . , 1 day, . . . , 1 week, . . . ; 1 work shift, 2 work shifts, 3 work shifts, . . . ; etc.) can be added to or maintained on the list of favorite screens, or frequency (e.g., expected frequency of observed frequency), or a screen that has been accessed for a specified length of time, or for a longer length of time relative to other screens over a given time period, can be added to or maintained on the list of favorite screens.

At 1508, a screen can be identified as a favorite screen based at least in part on the one or more favorite-screen identification rules. At 1510, the identified screen can be added to the list of favorite screens. In adding the screen as a favorite screen in the list of favorite screens, depending in part on the maximum number of favorite screens allowed on the list or other factors, the screen can be added to the list without removing another screen from the list, or another screen can be removed from the list when the newly identified favorite screen is added to the list.

In an embodiment, a context menu, such as a long-press context menu, can be employed to facilitate enabling a screen being displayed to be saved as a favorite screen that can be included in the list of favorite screens. For instance, employing the ESOC and interface component, the user can perform an action in relation to the screen by clicking (e.g., using a mouse), touching (e.g., on a touch screen display), or pressing a specified button (e.g., on a keyboard) for a specified period of time (e.g., 1 second, 2 seconds, 3 seconds, . . . ), and in response to such action, the ESOC can save the screen as a favorite screen in the list of favorite screens.

Figure 16:
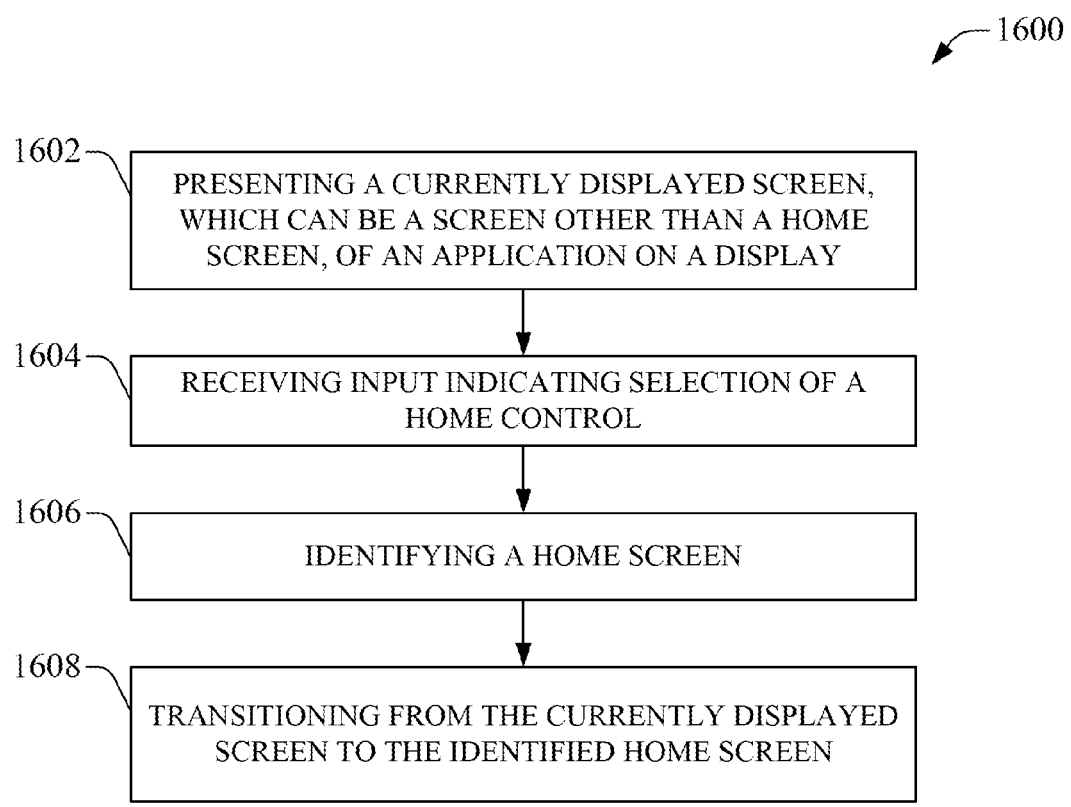
FIG. 16 illustrates a flow diagram of an example method for navigating to a home screen in association with a multi-tier hierarchical structure in accordance with aspects of the disclosed subject matter.

FIG. 16 is a flowchart of an example method 1600 for navigating to a home screen in association with a multi-tier hierarchical structure in accordance with aspects of the disclosed subject matter. At 1602, a currently displayed screen, which can be a screen other than a home screen, of an application can be presented on a display. At 1604, input indicating selection of a home control can be received. For instance, the terminal can receive input indicating that the home control button was selected or manipulated. At 1606, a home screen can be identified. In an aspect, a home screen associated with the user can be identified based at least in part on information (e.g., authentication credentials, current home screen selection, role or group associated with the user, etc.) associated with the user. At 1608, the application can transition from the currently displayed screen to the identified home screen. In the display, the currently displayed screen can be replaced or removed from the display, and the identified home screen can be presented (e.g., displayed) in the display of the interface component of the terminal.

In accordance with various embodiments, a home screen can be selected by a user, such as a designer, at design time, as more fully disclosed herein. Additionally or alternatively, a context menu, such as a long-press context menu, can be employed to facilitate enabling a screen being displayed to be selected as a home screen. For instance, employing the ESOC and interface component, the user can perform an action in relation to the screen by clicking (e.g., using a mouse), touching (e.g., on a touch screen display), or pressing a specified button (e.g., on a keyboard) for a specified period of time (e.g., 1 second, 2 seconds, 3 seconds, . . . ), and in response to such action, the ESOC can save the screen as a home screen.

One or more methods disclosed throughout the subject specification and annexed drawings are capable of being stored on an article of manufacture to facilitate transporting and transferring such method(s) to computers or chipsets with processing capability(ies) for execution, and thus implementation, by a processor, or for storage in a memory. In an aspect, one or more processors that enact method(s) described herein can be employed to execute computer-executable code instructions retained in a memory, or any computer-readable or machine-readable medium, to implement method(s) described herein; the code instructions, when executed by the one or more processor implement or carry out the various acts in the method(s) described herein. The computer-executable code instructions provide a computer-executable or machine-executable framework to enact, or implement, the method(s) described herein.

Figure 17:
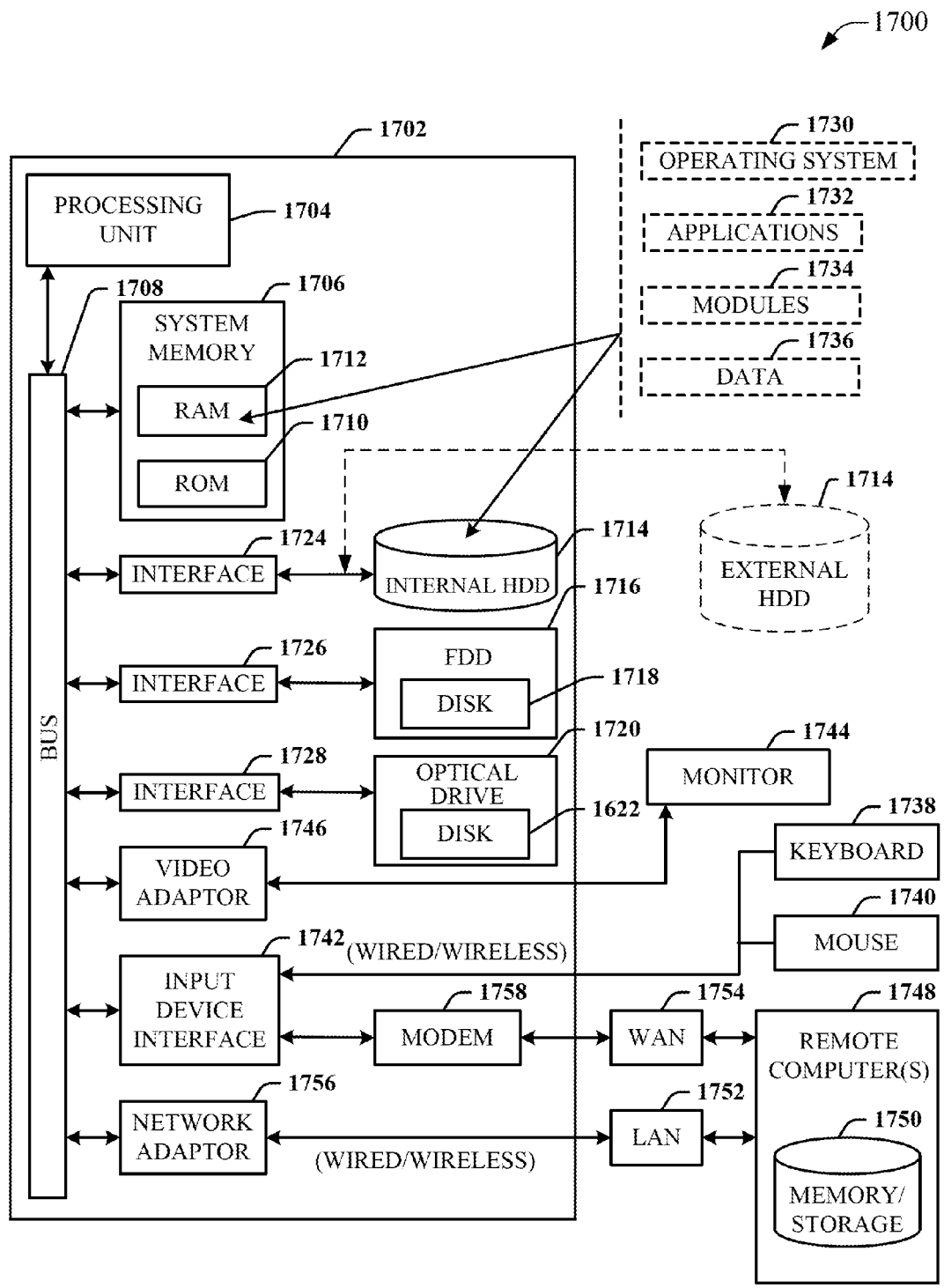
FIG. 17 depicts a block diagram of a computer operable to execute the disclosed architecture.

Referring now to FIG. 17, there is illustrated a block diagram of a computer operable to execute the disclosed architecture. In order to provide additional context for various aspects thereof, FIG. 17 and the following discussion are intended to provide a brief, general description of a suitable computing environment 1700 in which the various aspects of the disclosed subject matter can be implemented. While the description above is in the general context of computer-executable instructions that may run on one or more computers, those skilled in the art will recognize that the disclosed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the disclosed subject matter also can be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

A computer and computing devices in general typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 17, the example environment 1700 for implementing various aspects includes a computer 1702, the computer 1702 including a processing unit 1704, a system memory 1706 and a system bus 1708. The system bus 1708 couples system components including, but not limited to, the system memory 1706 to the processing unit 1704. The processing unit 1704 can be any of various commercially available processors. Dual microprocessors and other multi-processor architectures may also be employed as the processing unit 1704.

The system bus 1708 can be any of several types of bus structure that may further interconnect to a memory bus (with or without a memory controller), a peripheral bus, and a local bus using any of a variety of commercially available bus architectures. The system memory 1706 includes read-only memory (ROM) 1710 and random access memory (RAM) 1712. A basic input/output system (BIOS) is stored in a non-volatile memory 1710 such as ROM, EPROM, EEPROM, which BIOS contains the basic routines that help to transfer information between elements within the computer 1702, such as during start-up. The RAM 1712 can also include a high-speed RAM such as static RAM for caching data.

The computer 1702 further includes an internal hard disk drive (HDD) 1714 (e.g., EIDE, SATA), which internal hard disk drive 1714 may also be configured for external use in a suitable chassis (not shown), a magnetic floppy disk drive (FDD) 1716, (e.g., to read from or write to a removable diskette 1718) and an optical disk drive 1720, (e.g., reading a CD-ROM disk 1722 or, to read from or write to other high capacity optical media such as the DVD). The hard disk drive 1714, magnetic disk drive 1716 and optical disk drive 1720 can be connected to the system bus 1708 by a hard disk drive interface 1724, a magnetic disk drive interface 1726 and an optical drive interface 1728, respectively. The interface 1724 for external drive implementations includes at least one or both of Universal Serial Bus (USB) and IEEE 1394 interface technologies. Interface 1724 enables functional coupling of computer 1702 to a removable memory, such as a USB memory device or a SD memory card. Other external drive connection technologies are within contemplation of the disclosed subject matter.

The drives and their associated computer-readable media provide nonvolatile storage of data, data structures, computer-executable instructions, and so forth. For the computer 1702, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the example operating environment, and further, that any such media may contain computer-executable instructions for performing the methods of the disclosed subject matter.

A number of program modules can be stored in the drives and RAM 1712, including an operating system 1730, one or more application programs 1732, other program modules 1734 and program data 1736. All or portions of the operating system, applications, modules, and/or data can also be cached in the RAM 1712. It is to be appreciated that the disclosed subject matter can be implemented with various commercially available operating systems or combinations of operating systems.

A user can enter commands and information into the computer 1702 through one or more wired/wireless input devices, e.g., a keyboard 1738 and a pointing device, such as a mouse 1740. Other input devices (not shown) may include a microphone, an IR remote control, a joystick, a game pad, a stylus pen, touch screen, or the like. These and other input devices are often connected to the processing unit 1704 through an input device interface 1742 that is coupled to the system bus 1708, but can be connected by other interfaces, such as a parallel port, an IEEE 1394 serial port, a game port, a USB port, an IR interface, etc.

A monitor 1744 or other type of display device is also connected to the system bus 1708 via an interface, such as a video adapter 1746. In addition to the monitor 1744, a computer typically includes other peripheral output devices (not shown), such as speakers, printers, etc.

The computer 1702 may operate in a networked environment using logical connections via wired and/or wireless communications to one or more remote computers, such as a remote computer(s) 1748. The remote computer(s) 1748 can be a workstation, a server computer, a router, a personal computer, portable computer, microprocessor-based entertainment appliance, a peer device or other common network node, and typically includes many or all of the elements described relative to the computer 1702, although, for purposes of brevity, only a memory/storage device 1750 is illustrated. The logical connections depicted include wired/wireless connectivity to a local area network (LAN) 1752 and/or larger networks, e.g., a wide area network (WAN) 1754. Such LAN and WAN networking environments are commonplace in offices and companies, and facilitate enterprise-wide computer networks, such as intranets, all of which may connect to a global communications network, e.g., the Internet.

When used in a LAN networking environment, the computer 1702 is connected to the local network 1752 through a wired and/or wireless communication network interface or adapter 1756. The adaptor 1756 may facilitate wired or wireless communication to the LAN 1752, which may also include a wireless access point disposed thereon for communicating with the wireless adaptor 1756.

When used in a WAN networking environment, the computer 1702 can include a modem 1758, or is connected to a communications server on the WAN 1754, or has other means for establishing communications over the WAN 1754, such as by way of the Internet. The modem 1758, which can be internal or external and a wired or wireless device, is connected to the system bus 1708 via the serial port interface 1742. In a networked environment, program modules depicted relative to the computer 1702, or portions thereof, can be stored in the remote memory/storage device 1750. It will be appreciated that the network connections shown are illustrative and other means of establishing a communications link between the computers can be used.

The computer 1702 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5

GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 18:
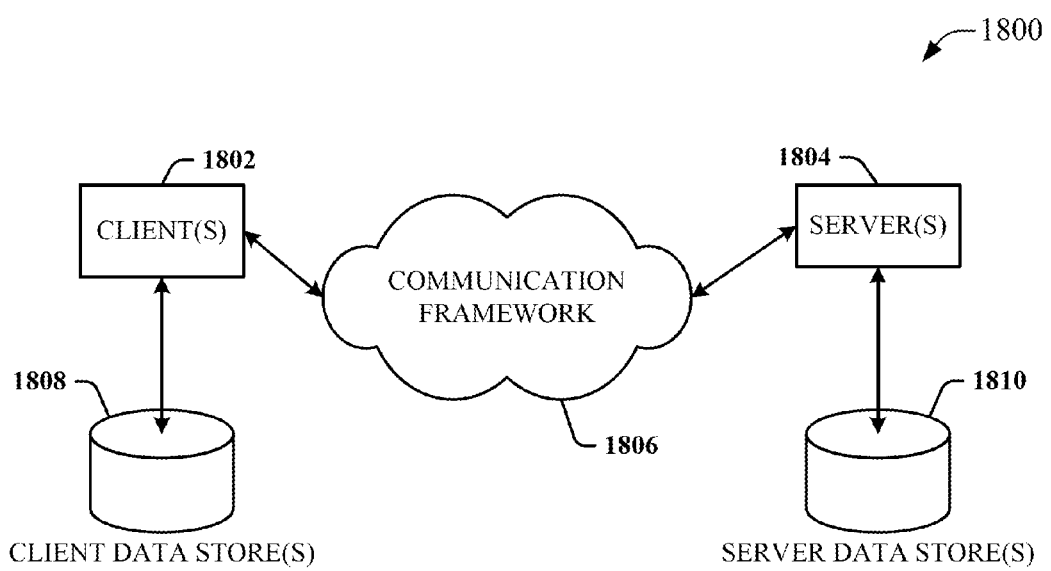
FIG. 18 illustrates a schematic block diagram of an example computing environment.

Referring now to FIG. 18, there is illustrated a schematic block diagram of an example computing environment 1800 in accordance with another aspect. The system 1800 includes one or more client(s) 1802. The client(s) 1802 can be hardware and/or software (e.g., threads, processes, computing devices). The client(s) 1802 can house cookie(s) and/or associated contextual information by employing the disclosed subject matter, for example.

The system 1800 also includes one or more server(s) 1804. The server(s) 1804 can also be hardware and/or software (e.g., threads, processes, computing devices). The servers 1804 can house threads to perform transformations by employing the invention, for example. One possible communication between a client 1802 and a server 1804 can be in the form of a data packet adapted to be transmitted between two or more computer processes. The data packet may include a cookie and/or associated contextual information, for example. The system 1800 includes a communication framework 1806 (e.g., a global communication network such as the Internet) that can be employed to facilitate communications between the client(s) 1802 and the server(s) 1804.

Communications can be facilitated via a wired (including optical fiber) and/or wireless technology. The client(s) 1802 are operatively connected to one or more client data store(s) 1808 that can be employed to store information local to the client(s) 1802 (e.g., cookie(s) or associated contextual information). Similarly, the server(s) 1804 are operatively connected to one or more server data store(s) 1810 that can be employed to store information local to the servers 1804.

In the subject specification and annexed drawings, terms such as "repository," "store," "data store," data storage," and substantially any term(s) that convey other information storage component(s) relevant to operation and functionality of a functional element or component described herein, refer to "memory components," or entities embodied in a "memory" or components comprising the memory. The memory components described herein can be either volatile memory or nonvolatile memory, or can include both volatile and nonvolatile memory. In addition, the memory components described herein can be statically affixed (screwed, bolted, soldered, etc.) or removably affixed. Further, the memory components can include computer-readable or machine-readable storage media.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of further illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device (e.g., a PAC), discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps or acts of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An example storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

What has been described above includes examples of the disclosed subject matter. It is, of course, not possible to describe every conceivable combination of components and/or methods, but one of ordinary skill in the art may recognize that many further combinations and permutations are possible. Accordingly, the disclosed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a memory to store computer-executable components; and
a processor, coupled to the memory, that facilitates execution of the computer-executable components, the computer-executable components comprising:
an enhanced screen organization component that is configured to organize one or more screens and one or more folders in relation to each other, in accordance with at least one defined organization criterion, to generate an organized multi-tier screen-folder structure, which is associated with an application that facilitates operation of a control system, wherein the organized multi-tier screen-folder structure comprises a first set of screens and folders associated with a first user identity based at least in part on a first set of access rights associated with the first user identity, and a second set of screens and folders associated with a second user identity based at least in part on a second set of access rights associated with the second user identity, to facilitate presentation of the first set of screens and folders and the second set of screens and folders via a display of a terminal; and
an interface component that is configured to present, via the display of the terminal, at least a portion of the organized multi-tier screen-folder structure, comprising at least a portion of the one or more screens and a portion of the one or more folders, to facilitate the operation of the control system.

2. The system of claim 1, wherein a first screen of the one or more screens is configured to comprise information associated with the control system, wherein at least a portion of the information changes over time during run time, and wherein the interface component is further configured to present at least the portion of the information at a given time during run time.

3. The system of claim 1, wherein a screen of the one or more screens is part of the first set of screens and folders and the second set of screens and folders, and comprises multiple instances at a given time, wherein the multiple instances of the screen comprise a first instance and a second instance, and the first instance comprises a first set of parameters that is determined based at least in part on the first set of access rights to facilitate presentation of the first set of parameters via the screen to the first user identity and the second instance comprises a second set of parameters that is determined based at least in part on the second set of access rights to facilitate presentation of the second set of parameters via the screen to the second user identity.

4. The system of claim 1, wherein the interface component is further configured to, at different times, present, via the display of the terminal, the first set of screens and folders and the second set of screens and folders, in accordance with the first set of access rights and the second set of access rights.

5. The system of claim 1, wherein at least the portion of the organized multi-tier screen-folder structure is organized during design time for use during run time, and at least another portion of the organized multi-tier screen-folder structure is organized during run time, wherein the enhanced screen organization component is further configured to provide, via the interface component during run time, a set of configuration screens comprising a set of configuration options that enables modification of the organized multi-tier screen-folder structure during run time while on-line, in accordance with the first set of access rights granted to the first user identity.

6. The system of claim 1, wherein the enhanced screen organization component is further configured to apply one or more filters to the organized multi-tier screen-folder structure to generate at least the portion of the organized multi-tier screen-folder structure, wherein the one or more filters is based at least in part on the first set of access rights of the first user identity, a group of user identities, a role of the first user identity in connection with the control system, or an authentication credential associated with the first user identity.

7. The system of claim 1, wherein at least one screen is selected as at least one of a global home screen or a specified home screen, wherein the global home screen is utilized as a home screen in connection with the first user identity in response to the specified home screen not being assigned in connection with the first user identity.

8. The system of claim 1, wherein the enhanced screen organization component is further configured to enable selection of a replacement home screen during run time and facilitate provision of a context menu that facilitates selection of a screen of the portion of the organized multi-tier screen-folder structure as the replacement home screen.

9. The system of claim 8, wherein the context menu is a long-press context menu that is configured to select a presented screen as the replacement home screen in response to repeatedly manipulating a control associated with the interface component for at least a defined amount of time.

10. The system of claim 1, wherein the enhanced screen organization component is further configured to select a screen, of at least the portion of the one or more screens, as a favorite screen contained in a set of favorite screens, in accordance with the at least one defined organization criterion.

11. The system of claim 10, wherein the enhanced screen organization component is further configured to select the screen as the favorite screen in response to the screen being determined to have been accessed more frequently or more recently than another screen.

12. The system of claim 1, wherein a screen of the one or more screens is represented by an icon on a display of the interface component, and wherein the icon is at least one of a generic icon or a thumbnail image representative of the screen.

13. The system of claim 12, wherein the screen is presented on the display of the interface component with a screen display name based at least in part on name information received from the first user identity via the interface component, wherein the screen display name is same as or different from an original screen display name of the screen, wherein at least the screen display name is presented in a language selected from a plurality of available languages, and wherein the enhanced screen organization component selects the language in response to selection information received from the first user identity via the interface component or based at least in part on an authentication credential associated with the first user identity.

14. The system of claim 1, wherein the at least one defined organization criterion relates to at least one of the control system, the application, an available screen, a control system parameter of at least one of the one or more screens, current or historical information relating to access of the one or more screens, a frequency of access of respective frequencies of access of the one or more screens, a frequency of access of respective recencies of access of the one or more screens, at least one user preference, a user activity, the first user identity, the second user identity, a group of user identities, a first role of the first user identity in connection with the control system, or a second role of the second user identity in connection with the control system.

15. The system of claim 1, wherein the computer-executable components further comprise:
a security component that is configured to control access to at least the application in accordance with the first set of access rights, based at least in part on a defined security criterion.

16. The system of claim 15, wherein the security component is further configured to analyze an authentication credential associated with the first user identity via the interface component to determine whether the authentication credential matches any stored valid authentication credentials, identify and grant the first set of access rights to first set of screens and folders of the organized multi-tier screen-folder structure to the first user identity in response to the authentication credential being determined to be valid, and deny access to at least one of the application or the organized multi-tier screen-folder structure in response to determining that the authentication credential does not match any of the stored valid authentication credentials.

17. The system of claim 1, wherein the enhanced screen organization component is further configured to provide at least one control, wherein the at least one control facilitates at least one of access of a home screen, a navigation from a displayed item in a displayed tier of the organized multi-tier screen-folder structure to a different tier to display one or more other items in the different tier, a navigation from a displayed item to a different item to display the different item, a navigation from a displayed item to a previously displayed item to display the previously displayed item, a navigation from a displayed item forward to a different item that had previously been displayed, a navigation from display of one instance of an item to display a different instance of that item, an access of a favorite screen, an access of a screen of the one or more screens, an access of a folder of the one or more folders, an access of an alarm indicator or alarm screen, an access of a screen comprising trend information, an access of a screen or a file that comprises information regarding use of the application, an access of a tool screen that enables parameter adjustments relating to a terminal associated with the control system, a provision of a scroll function to scroll through displayed items in a menu, or a search for a screen or folder, wherein an item is at least one of a screen, a folder, a control, or a menu.

18. A method, comprising:
organizing, by a system comprising a processor, one or more screens and one or more folders in relation to each other to form a multi-level organized application structure during at least one of design time or run time, based at least in part on a defined organization criterion and an application associated with an industrial control system, wherein the multi-level organized application structure facilitates controlling at least a portion of the industrial control system during run time, and wherein the multi-level organized application structure comprises a first set of screens and folders associated with a first user identity based at least in part on a first set of access rights, and a second set of screens and folders associated with a second user identity based at least in part on a second set of access rights, to facilitate presenting the first set of screens and folders and the second set of screens and folders in accordance with the first set of access rights and the second set of access rights; and
presenting, by the system, at least a portion of the one or more screens and the one or more folders in accordance with the multi-level organized application structure, to facilitate operation of the industrial control system.

19. The method of claim 18, further comprising: at least one of:
creating, by the system, at least one folder of the one or more folders during the at least one of design time or run time, wherein the at least one folder is included in the multi-level organized application structure,
removing, by the system, the at least one folder from the multi-level organized application structure,
naming, by the system, the at least one folder,
adding, by the system, at least one screen to the at least one folder, or
removing, by the system, the at least one screen from the at least one folder.

20. The method of claim 18, further comprising: at least one of:
assigning, by the system, a first screen of the one or more screens as a global home screen for use in connection with the industrial control system,
assigning, by the system, a second screen of the one or more screens as a home screen for at least one of the first user identity, a group of user identities, or a role associated with the first user identity, associated with the industrial control system, or
assigning, by the system, at least one screen of the one or more screens as a favorite screen, wherein the at least one screen is saved in a favorites folder.

21. The method of claim 18, further comprising:
receiving, by the system, input information indicating manipulation of a control that is sustained continuously for at least a defined amount of time in relation to a displayed screen of the one or more screens;
selecting, by the system, the displayed screen as a favorite screen in response to the input information indicating manipulation of the control being sustained continuously for at least the defined amount of time; and
storing the displayed screen in a favorite folder.

22. The method of claim 18, further comprising:
identifying at least a portion of the one or more screens, which are to be utilized in connection with the application, during the at least one of design time or run time;
creating the one or more folders, wherein the one or more folders are used to store a screen(s) or another folder;
storing at least one screen, of the at least a portion of the one or more screens, in at least one folder of the one or more folders to facilitate the organizing of the one or more screens and the one or more folders in relation to each other to form the multi-level organized application structure, wherein the at least one folder is located in a first level and the at least one screen is located in a second level of the multi-level organized application structure, wherein the first level is at a higher hierarchical level than the second level; and
presenting the one or more screens and the one or more folders as organized to form the multi-level organized application structure.

23. The method of claim 18, further comprising:
receiving input information relating to manipulation of a navigation control;
in response to the receiving the input information, navigating from a displayed screen of the one or more screens to at least one of a folder of the one or more folders or a different screen of the one or more screens; and
displaying at least one of the folder or the different screen, wherein at least one of the folder or the different screen is located in a first level and the displayed screen is located in a second level of the multi-level organized application structure, wherein the first level is at a higher hierarchical level of the multi-level organized application structure than the second level.

24. The method of claim 18, further comprising:
receiving input information relating to manipulation of a control associated with a screen of the one or more screens, wherein the input information comprises a swipe gesture; and
executing at least one action in connection with the screen in response to the input information.

25. The method of claim 18, further comprising:
granting the first set of access rights to the first user identity based at least in part on an authentication credential associated with the first user identity;
analyzing the one or more folders and the one or more screens in relation to the first set of access rights;
determining one or more filters based at least in part on the first set of access rights; and
applying the one or more filters to the one or more folders and the one or more screens to generate the first set of screens and folders.

26. The method of claim 18, further comprising:
monitoring activity relating to the one or more screens;
applying one or more favorite-screen identification rules to information relating to the monitoring of the activity;
identifying at least one screen as a favorite screen based at least in part on the one or more favorite-screen identification rules;
adding the at least one screen to a set of favorite screens associated with at least one of the application or the first user identity; and
presenting the set of favorite screens.

27. The method of claim 26, wherein the one or more favorite-screen identification rules relate to at least one of respective frequencies of accessing of respective screens of the one or more screens, respective recencies of accessing of the respective screens of the one or more screens, or respective lengths of time of accessing of the respective screens of the one or more screens.

28. A computer program product comprising a non-transitory computer-readable medium storing computer-executable instructions that, in response to execution, cause a system comprising a processor to perform operations, comprising:
organizing organize one or more screens and one or more folders in relation to each other to form a multi-tier organized application structure during at least one of design time or run time, based at least in part on a defined organization criterion and an application associated with an industrial control system, wherein the multi-tier organized application structure facilitates controlling at least a portion of the industrial control system during run time, and wherein the multi-level organized application structure comprises a first set of screens and folders associated with a first user identity based at least in part on a first set of access rights, and a second set of screens and folders associated with a second user identity based at least in part on a second set of access rights, to facilitate displaying the first set of screens and folders and the second set of screens and folders in accordance with the first set of access rights and the second set of access rights, respectively; and
displaying at least a portion of the one or more screens and the one or more folders, in accordance with the multi-level organized application structure, to facilitate operation of the industrial control system.

29. The computer program product of claim 28, wherein a screen of the one or more screens is part of both the first set of screens and folders and the second set of screens and folders, and comprises multiple instances at a given time, wherein the multiple instances of the screen comprise a first instance and a second instance, and wherein the operations comprise:
determining a first set of parameters associated with the first instance, based at least in part on the first set of access rights, to facilitate presenting the first set of parameters via the screen to the first user identity; and
determining a second set of parameters associated with the second instance, based at least in part on the second set of access rights, to facilitate presenting the second set of parameters via the screen to the second user identity.

* * * * *